United States Patent
Shah et al.

(10) Patent No.: US 11,720,514 B2
(45) Date of Patent: Aug. 8, 2023

(54) PROVISIONING CONNECTION INFORMATION FOR DISPLAY ON CABLES USED TO COUPLE DEVICES

(71) Applicant: Dell Products L.P., Round Rock, TX (US)

(72) Inventors: Maunish A. Shah, Austin, TX (US); Shree Rathinasamy, Round Rock, TX (US); Joseph LaSalle White, San Jose, CA (US); Per Henrik Fremrot, Novato, CA (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 17/569,847

(22) Filed: Jan. 6, 2022

(65) Prior Publication Data

US 2023/0214344 A1 Jul. 6, 2023

(51) Int. Cl.
*G06F 13/40* (2006.01)
*G06F 1/16* (2006.01)
*G06F 3/14* (2006.01)

(52) U.S. Cl.
CPC .......... *G06F 13/409* (2013.01); *G06F 1/1684* (2013.01); *G06F 3/1423* (2013.01)

(58) Field of Classification Search
CPC .... G06F 13/305; G06F 13/409; G06F 1/1684; G06F 3/1423; H01B 11/00; H01R 13/641
USPC ....................................................... 710/305
See application file for complete search history.

(56) References Cited

U.S. PATENT DOCUMENTS

| | | | | |
|---|---|---|---|---|
| 5,920,197 A | * | 7/1999 | Price | H01R 13/641 324/415 |
| 6,361,357 B1 | * | 3/2002 | Stillwell | H01R 13/6691 362/23.15 |
| 6,733,333 B1 | * | 5/2004 | Chen | H01R 13/717 439/660 |
| 7,019,658 B1 | * | 3/2006 | Erickson | H01R 13/6641 340/815.45 |
| 7,168,975 B2 | * | 1/2007 | Kuo | H01R 13/641 439/490 |
| 7,247,046 B1 | * | 7/2007 | Wu | H01R 13/6691 439/490 |

(Continued)

OTHER PUBLICATIONS

A. Ghiasi et al., "QSFP-DD/QSFP-DD800/QSFP112 Hardware Specification for QSFP Double Density 8X and QSFP 4X Pluggable Transceivers," www.QSFP-DD.com, May 28, 2021, 167 pages.

(Continued)

*Primary Examiner* — Paul R. Myers
(74) *Attorney, Agent, or Firm* — Ryan, Mason & Lewis, LLP

(57) ABSTRACT

An apparatus comprises a processing device configured to generate connectivity information associated with at least one of a first device coupled to a first cable connector at a first end of a cable and a second device coupled to a second cable connector at a second end of the cable opposite the first end of the cable. The processing device is also configured to provision, via an integrated sideband interface of the cable, the generated connectivity information for display on at least one of a first cable display proximate the first cable connector at the first end of the cable and a second cable display proximate the second cable connector at the second end of the cable.

20 Claims, 18 Drawing Sheets

(56) References Cited

U.S. PATENT DOCUMENTS

| | | | | |
|---|---|---|---|---|
| 7,352,289 | B1* | 4/2008 | Harris | H04Q 9/00 324/67 |
| 8,184,933 | B1* | 5/2012 | Aybay | G02B 6/3895 385/100 |
| 9,438,295 | B1* | 9/2016 | Song | H04M 1/04 |
| 9,608,386 | B2* | 3/2017 | Jenkins | H01R 13/7172 |
| 9,619,979 | B1* | 4/2017 | Montero | H04L 69/03 |
| 9,660,396 | B2* | 5/2017 | Chen | H01R 13/6675 |
| 9,772,788 | B1* | 9/2017 | Beall | G06F 3/067 |
| 11,494,156 | B1* | 11/2022 | Shah | G06F 3/147 |
| 11,509,130 | B2* | 11/2022 | Mishra | H02H 1/0007 |
| 2003/0061393 | A1* | 3/2003 | Steegmans | H04L 41/00 709/250 |
| 2005/0023026 | A1* | 2/2005 | Chen | H01R 13/641 174/74 R |
| 2005/0124209 | A1* | 6/2005 | Currie | H01R 13/7172 439/490 |
| 2005/0188231 | A1* | 8/2005 | Lai | G06F 11/3055 713/300 |
| 2005/0215110 | A1* | 9/2005 | Chen | H01R 13/717 439/502 |
| 2005/0245115 | A1* | 11/2005 | Bell | G06F 1/1632 439/165 |
| 2005/0260884 | A1* | 11/2005 | Yueh | H01R 13/6691 439/488 |
| 2007/0004270 | A1* | 1/2007 | Kim | G09G 5/006 439/497 |
| 2007/0205667 | A1* | 9/2007 | Lin | G06F 13/409 307/42 |
| 2008/0133047 | A1* | 6/2008 | Best | H01R 9/2475 340/568.1 |
| 2008/0315889 | A1* | 12/2008 | Johnsen | H04Q 1/066 324/512 |
| 2010/0174667 | A1* | 7/2010 | Vitale | B60L 53/305 705/412 |
| 2011/0173315 | A1* | 7/2011 | Aguren | H04L 63/16 709/224 |
| 2011/0256769 | A1* | 10/2011 | Wu | H01R 13/7175 439/620.02 |
| 2013/0170801 | A1* | 7/2013 | Do | G02B 6/4472 385/101 |
| 2015/0015403 | A1* | 1/2015 | LeMaistre | G01R 19/155 340/654 |
| 2015/0026366 | A1* | 1/2015 | Altmann | G06F 13/36 710/14 |
| 2016/0073544 | A1* | 3/2016 | Heyd | G06F 1/185 361/679.31 |
| 2016/0226199 | A1* | 8/2016 | Zhou | H01R 13/7175 |
| 2017/0308453 | A1* | 10/2017 | Hardt | G06F 11/2289 |
| 2019/0356070 | A1* | 11/2019 | Lu | H01R 12/7088 |
| 2019/0387294 | A1* | 12/2019 | Polland | H04L 41/0816 |
| 2020/0303935 | A1* | 9/2020 | Sorias | H02J 7/0048 |
| 2021/0042007 | A1* | 2/2021 | Damodaran | G06F 3/0483 |

OTHER PUBLICATIONS

T. Palkert et al., "QSFP+ 4X 10 Gb/s Pluggable Transceiver," SFF-8436 Rev 4.9, SFF Committee, http://www.snia.org/sff/specifications, Aug. 31, 2018, 88 pages.

U.S. Appl. No. 17/382,913 filed in the name of Maunish Shah et al. filed Jul. 22, 2021, and entitled "Cable Connection Information Display System."

* cited by examiner

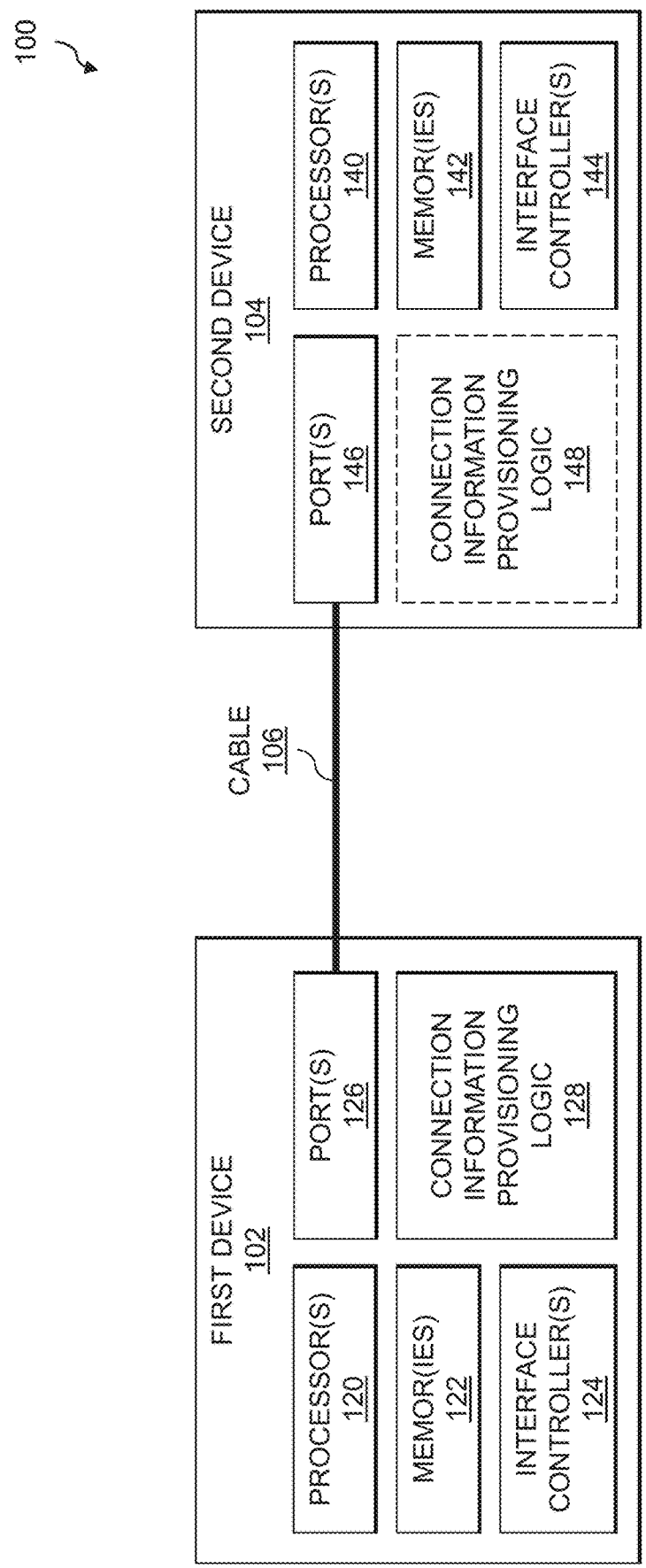

PROVISIONING CONNECTION INFORMATION FOR DISPLAY ON CABLES USED TO COUPLE DEVICES

FIELD

The field relates generally to information processing, and more particularly to cable management in information processing systems.

BACKGROUND

Information processing systems may include various hardware and software components that may be configured to process, store, and communicate information, and may include one or more computer systems, data storage systems, and networking systems. Switch and other networking devices, for example, may be connected to many other computing devices (e.g., server devices, other switch or networking devices, storage systems, etc.) in a data center via cabling to facilitate transmission of data between such devices. In large data centers with many such devices, cable management and determining connectivity between devices are difficult tasks.

SUMMARY

Illustrative embodiments of the present disclosure provide techniques for provisioning connection information for display on cables used to couple devices.

In one embodiment, an apparatus comprises at least one processing device comprising a processor coupled to a memory. The at least one processing device is configured to perform the step of generating connectivity information associated with at least one of a first device coupled to a first cable connector at a first end of a cable and a second device coupled to a second cable connector at a second end of the cable opposite the first end of the cable. The at least one processing device is also configured to perform the step of provisioning, via an integrated sideband interface of the cable, the generated connectivity information for display on at least one of a first cable display proximate the first cable connector at the first end of the cable and a second cable display proximate the second cable connector at the second end of the cable.

In another embodiment, a cable comprises cable wiring comprising two or more communication wires, a first cable connector at a first end of the cable wiring, a second cable connector at a second end of the cable wiring, and at least one cable display proximate at least one of the first cable connector and the second cable connector, the at least one cable display comprising an integrated sideband interface coupled to a subset of the two or more communication wires of the cable wiring. The integrated sideband interface is configured to receive, via the subset of the two or more communication wires of the cable wiring, connectivity information for display on the at least one cable display, the connectivity information being associated with at least one of a first device coupled to the first cable connector and a second device coupled to the second cable connector.

These and other illustrative embodiments include, without limitation, methods, apparatus, networks, systems and processor-readable storage media.

BRIEF DESCRIPTION OF THE DRAWINGS

FIGS. 1A and 1B show an information processing system configured for provisioning and displaying connection information on cables used to couple two devices in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Information processing systems may include switches or other network devices that connect multiple computing devices (e.g., server devices, other switch or network devices, storage systems, etc.) via cabling. The cabling provides for transmission of data between such devices. In large data centers, the number of cables required for connecting such devices can make it difficult to determine connectivity between devices. For example, a given computing device may be coupled to a given switch device via a cable that connects to ports on the given switch device and the given computing device. The connectivity of the given switch device and the given computing device may be tracked via the use of physical cable "tags" on each end of the cable (e.g., the cable tag adjacent the end of the cable that is connected to the given computing device will identify the connection to the given switch device, and the cable tag adjacent the end of the cable that is connected to the given switch device will identify the connection to the given computing device). Such cable tags are typically created using a label maker, and then attached to each end of the cable manually by a network administrator. Inappropriate handling of the cable (e.g., during cable connection tracing) can cause the cable tag to detach from the cable, and any change in the connection of the cable (e.g., to a different networking device and/or computing device) requires the removal of the "old" cable tag and the creation of a "new" cable tag that accurately describes the connection. Such issues are exacerbated when a patch panel is used to connect a switch device and a computing device, as both the cable between the switch device and the patch panel, as well as the cable between the computing device and the patch panel, are subject to the issues discussed above. Accordingly, there is a need for providing cable connection information display systems that addresses the issues discussed above.

Figure 1B:
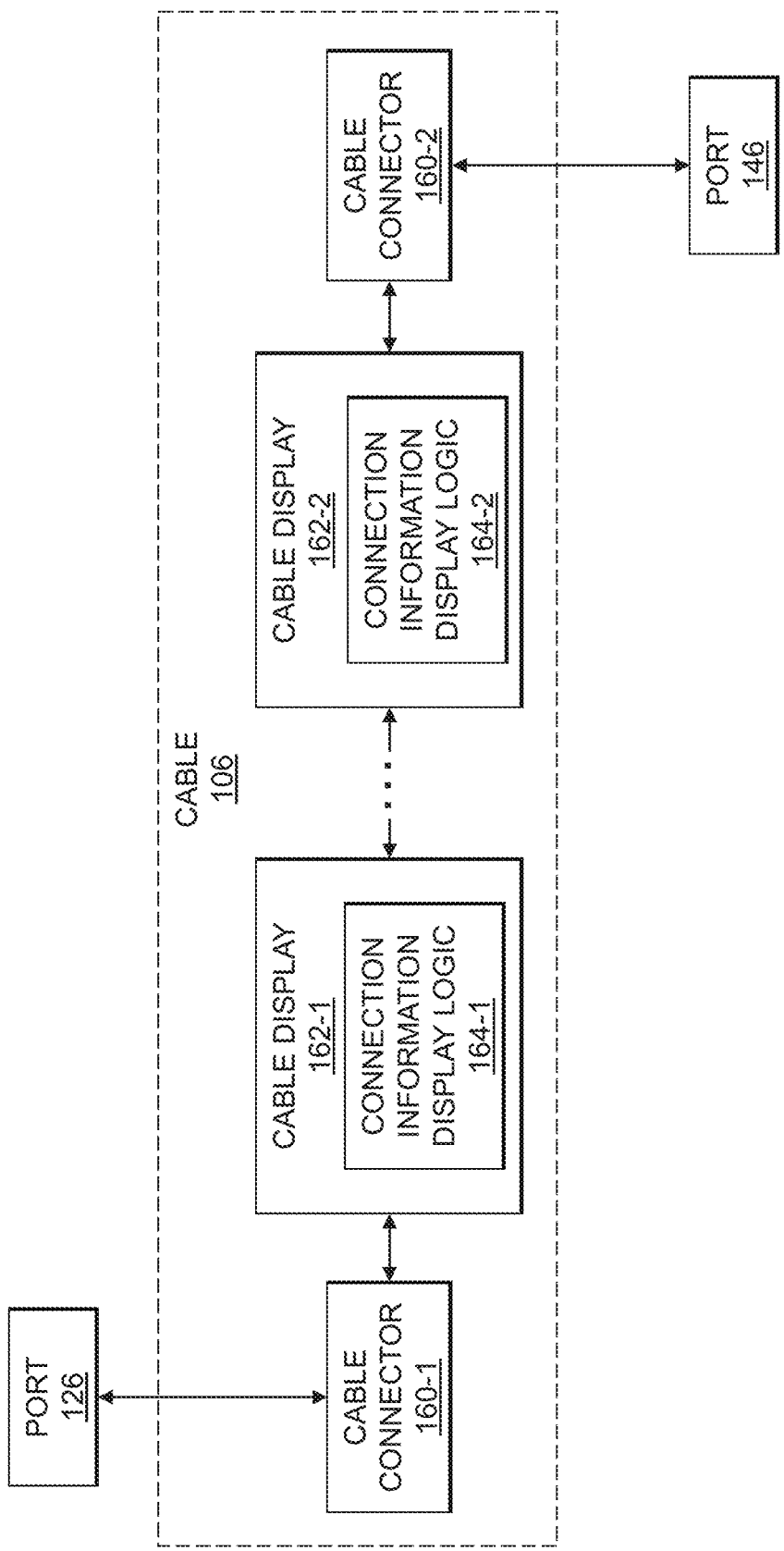

FIGS. 1A and 1B show an information processing system 100 configured in accordance with an illustrative embodiment to provide functionality for provisioning and displaying connection information on cables used to couple devices. As shown in FIG. 1A, the information processing system 100 includes a first device 102 coupled to a second device 104 via a cable 106. The first device 102 includes one or more processors 120, one or more memories 122, one or more ports 126, and one or more interface controllers 124. The ports 126 and interface controllers 124 may collectively provide what is more generally referred to herein as a network interface. The second device 104 similarly includes one or more processors 140, one or more memories 142, one or more interface controllers 144, and one or more ports 146. The cable 106 is coupled between one of the ports 126 of the first device 102 and one of the ports 146 of the second device 104.

The processors 120, 140 may comprise one or more microprocessors, microcontrollers, application-specific integrated circuits (ASICs), field-programmable gate arrays (FPGAs), central processing units (CPUs), graphical processing units (GPUs), tensor processing units (TPUs), video processing units (VPUs), network processing units (NPUs), complex programmable logic devices (CPLDs) or other types of processing circuitry, as well as portions or combinations of such circuitry elements.

The memories 122, 142 may comprise random access memory (RAM), read-only memory (ROM), flash memory or other types of memory, in any combination. The memories 122, 142 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

The interface controllers 124, 144 and ports 126, 146 provide network interface circuitry for interfacing the devices 102, 104 with one another and other system components (e.g., over networks provided using cable 106), and may comprise transceivers.

As shown in FIG. 1B, the cable 106 includes a first cable connector 160-1 at a first end coupled to one of the ports 126 of the first device 102 and a second cable connector 160-2 at a second end coupled to one of the ports 146 of the second device 104. The cable 106 further includes a first cable display 162-1 proximate the first cable connector 160-1 at the first end of the cable 106 and a second cable display 162-2 proximate the second cable connector 160-2 at the second end of the cable 106. In some embodiments, the cable 106 includes a Direct Attach Copper (DAC) cable with the cable connectors 160-1 and 160-2 (collectively, cable connectors 160) being respective DAC cable connectors on opposing ends of the cable 106. In other embodiments, however, the cable 106 may comprise an Ethernet cable system, a fiber optic cable system or another type of cable system. As will be discussed in further detail below, a cable system may be a breakout cable system (e.g., a cable system with a single cable connector on a first end of a cable and multiple cable connectors on respective second ends of the cable). Although FIG. 1 and other embodiments are described herein with respect to cables having cable displays at each end thereof, this is not a requirement. A cable may have only a single cable display proximate a single one of the cable connectors at a single end thereof.

The cable displays 162-1 and 162-2 (collectively, cable displays 162) may include various types of display devices. In some embodiments, the cable displays 162 comprise glass-free, flexible display devices that are configured to "wrap" around the circumference of the cable 106. Such flexible display devices, also referred to as rollable displays, may include flexible active-matrix electrophoretic displays (EPDs) available in various sizes suitable for cable circumferences and configured for relatively low temperature operation.

The processors 120, memories 122 and interface controllers 124 of the first device 102 illustratively implement connection information provisioning logic 128 configured to generate or otherwise provision connection information that is to be displayed on the cable 106 (e.g., on one or both of the cable displays 162-1 and 162-2). The processors 140, memories 142 and interface controllers 144 of the second device 104 may also optionally implement connection information provisioning logic 148 configured to generate or otherwise provision connection information that is to be displayed on the cable 106 (e.g., on one or both of the cable displays 162-1 and 162-2 thereof). As will be described in further detail elsewhere herein, the connection information provisioning logic 148 is optional (and is thus shown in dashed outline, as is connection information provisioning logic 248, 348 described below), in that the generation or other provisioning of the information to be displayed on both of the cable displays 162-1 and 162-2 of the cable 106 may be done solely by the first device 102 utilizing connection information provisioning logic 128 (e.g., the cable displays 162-1 and 162-2 at both the first and second ends of the cable 106 may be provisioned solely from one end of the cable 106). It should be noted that although the connection information provisioning logic 148 in this embodiment is optional, this should not be construed as an indication that other components of the information processing system 100 are required in this or any other embodiment unless otherwise noted.

The cable display 162-1 is configured to implement connection information display logic 164-1, and the cable display 162-2 is configured to implement connection information display logic 164-2. To do so, the cable displays 162-1 and 162-2 may utilize respective processors and memories (not explicitly shown). The connection information display logic 164-1 and 164-2 (collectively, connection information display logic 164) are configured to output on the cable displays 162-1 and 162-2 the connection information that is generated or otherwise provisioned by one or both of the connection information provisioning logic 128 of the first device 102 and the connection information provisioning logic 148 of the second device 104.

In some embodiments, the interface controllers 124, 144 provide Serial Peripheral Interface (SPI) systems, such as one or more SPI master systems (e.g., having one or more Master Out/Slave In (MOSI) elements, one or more Master In/Slave Out (MISO) elements, a Serial Clock (SCLK) element, and a plurality of Slave Select (SS) elements). Some SPI master systems may be limited in the number of SPI slave systems (e.g., 4 SPI slave systems) they support such that the interface controllers 124, 144 implement multiple SPI master systems as needed for larger numbers of cable systems. In other cases, an SPI master system may not be so restricted such that only a single SPI master system is required. The cable displays 162 may in some cases include SPI slave systems that are configured to receive connection information provisioned or generated by SPI master systems of the first and second devices 102 and 104. In such embodiments, the cable 106 may include a Slave Select/Chip Select (SS/CS) line, a Serial Clock (SCLK) line, and a Master Out/Slave In (MOSI) line that extend through the cable connectors 160 and the cable displays 162 for communicating the connection information to be output on the cable displays 162. It should be noted, however, that the use of an SPI sideband interface is not required or necessarily preferred. For example, other embodiments may utilize other types of sideband interfaces as will be described in further detail below.

While FIGS. 1A and 1B illustrate an example wherein a single cable 106 couples the first device 102 and the second device 104, in other embodiments a single computing device may be coupled to multiple other computing devices via one or more cables, including through the use of breakout or fan-out cables as described in further detail below.

Figure 2:
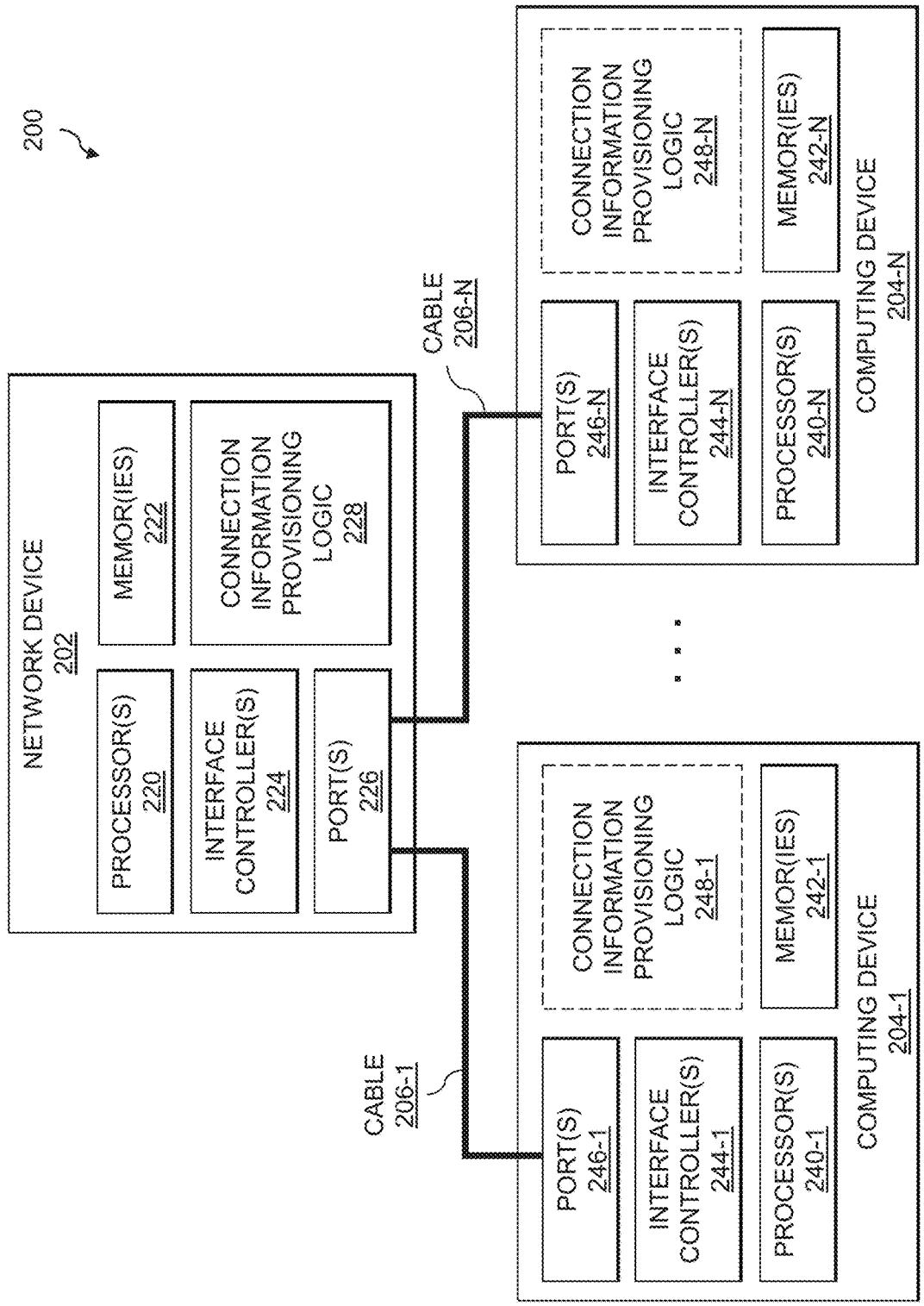
FIG. 2 shows another information processing system configured for provisioning and displaying connection information on cables used to couple a network device and multiple computing devices in an illustrative embodiment.

FIG. 2 illustrates an embodiment where an information processing system 200 includes a first device that is a switch or other network device 202 coupled to multiple computing devices 204-1, . . . 204-N (collectively, computing devices 204) via respective cables 206-1, . . . 206-N (collectively, cables 206). The network device 202 includes one or more processors 220, memories 222, interface controllers 224, ports 226 and connection information provisioning logic 228 configured in a manner similar to the processors 120, memories 122, interface controllers 124, ports 126 and connection information provisioning logic 128 of the first device 102 of FIG. 1. Each of the computing devices 204-1, . . . 204-N similarly includes one or more processors 240-1, . . . 240-N (collectively, processors 240), memories 242-1, . . . 242-N (collectively, memories 242), interface controllers 244-1, . . . 244-N (collectively, interface controllers 244), ports 246-1, . . . 246-N (collectively, ports 246), and optional connection information provisioning logic 248-1, . . . 248-N (collectively, connection information provisioning logic 248) configured in a manner similar to the processors 140, memories 142, interface controllers 144, ports 146 and connection information provisioning logic 148. Each of the cables 206 may be configured in a manner similar to that described above with respect to cable 106.

Figure 3A:
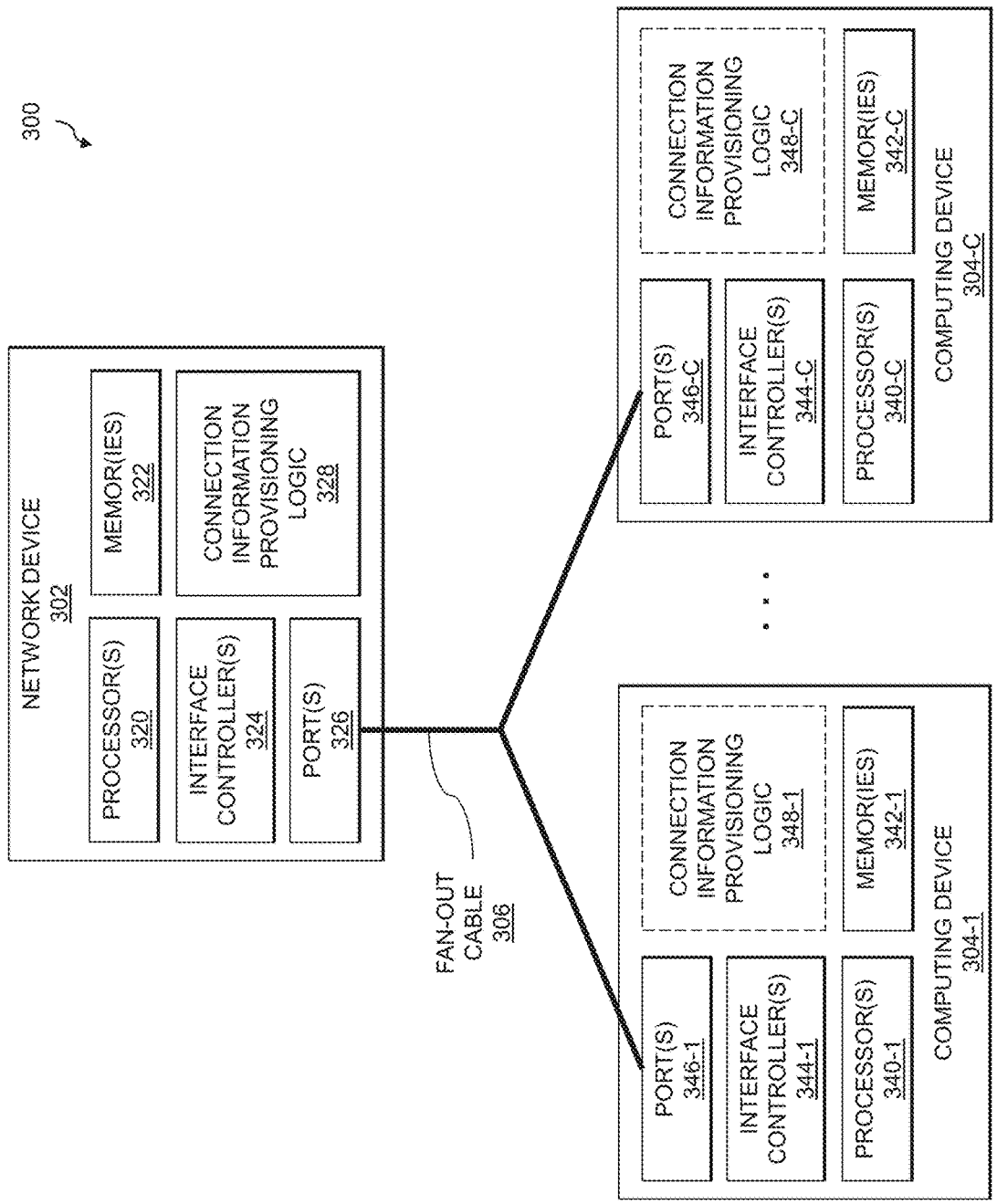
FIGS. 3A and 3B shows an information processing system configured for provisioning and displaying connection information on a fan-out cable used to couple a network device to multiple computing devices in an illustrative embodiment.
Figure 3B:
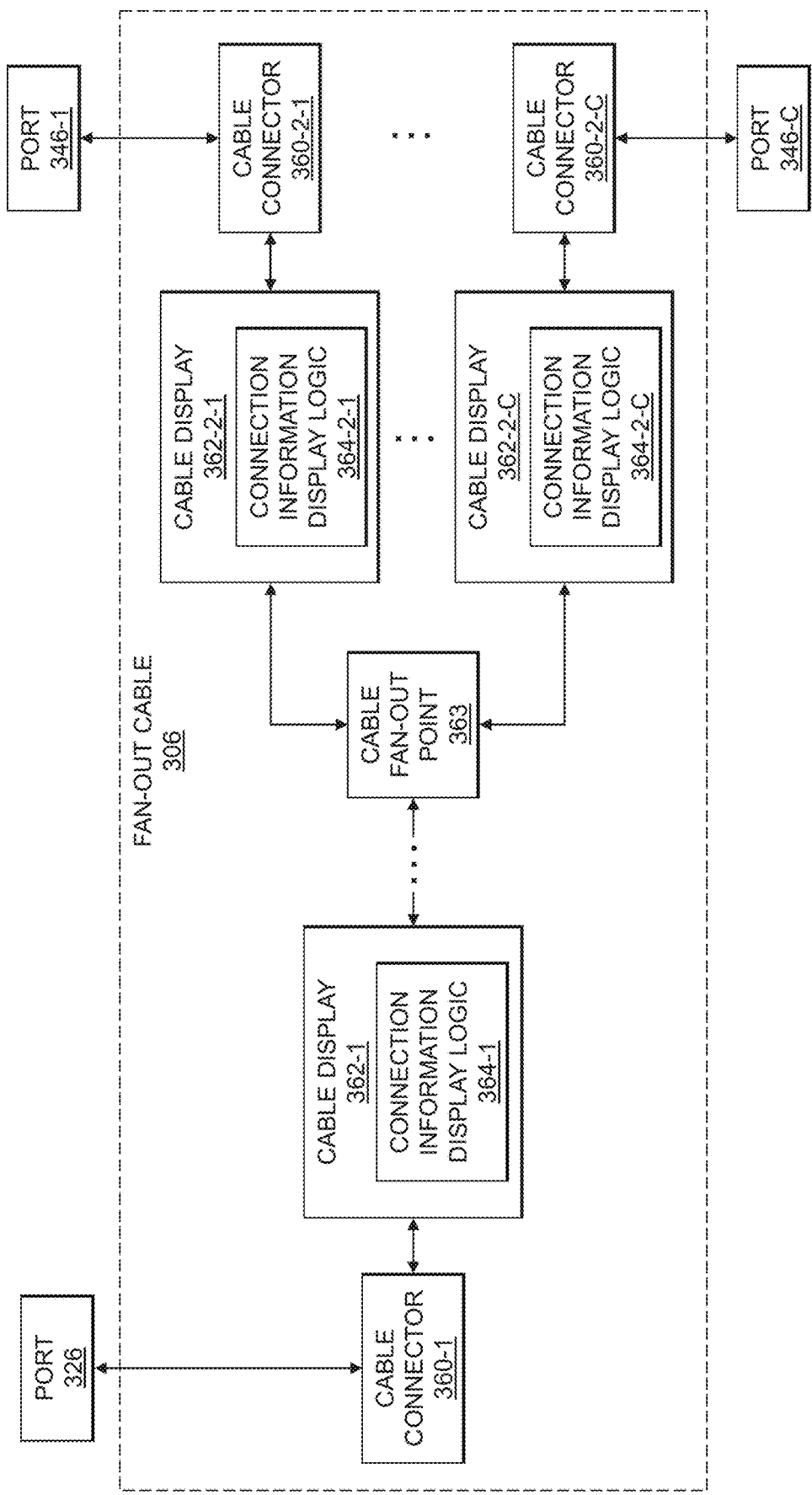

FIGS. 3A and 3B illustrate an embodiment where an information processing system 300 includes a first device that is a switch or other network device 302 coupled to multiple computing devices 304-1, . . . 304-C (collectively, computing devices 304) via a breakout or fan-out cable 306. As shown in FIG. 3A, the network device 302 includes one or more processors 320, memories 322, interface controllers 324, ports 326 and connection information provisioning logic 328 configured in a manner similar to the processors 120, memories 122, interface controllers 124, ports 126 and connection information provisioning logic 128 of the first device 102 of FIG. 1. Each of the computing devices 304-1, . . . 304-C similarly includes one or more processors 340-1, . . . 340-C (collectively, processors 340), memories 342-1, . . . 342-C (collectively, memories 342), interface controllers 344-1, . . . 344-C (collectively, interface controllers 344), ports 346-1, . . . 346-C (collectively, ports 346), and optional connection information provisioning logic 348-1, . . . 348-C (collectively, connection information provisioning logic 348) configured in a manner similar to that of the processors 140, memories 142, interface controllers 144, ports 146 and connection information provisioning logic 148.

As shown in FIG. 3B, the fan-out cable 306 includes a first cable connector 360-1 at a first end coupled to one of the ports 326 of the network device 302 and multiple second cable connectors 360-2-1, . . . 360-2-C (collectively, second cable connectors 360-2) at opposite ends for coupling to ports 346-1, . . . 346-C of the computing devices 304-1, . . . 304-C. Between the first end of the fan-out cable 306 with first cable connector 360-1 and the second ends of the fan-out cable 306 with second cable connectors 360-2 is a cable fan-out point 363. The fan-out cable 306 further includes a first cable display 362-1 proximate the first cable connector 360-1 at the first end of the fan-out cable 306 and second cable displays 362-2-1, . . . 362-2-C (collectively, second cable displays 362-2) proximate the second cable connectors 360-2 at the second ends of the fan-out cable 306. Each of the cable displays 362-1 and 362-2 (collectively, cable displays 362) are configured to implement respective instances of connection information display logic 364-1 and 364-2-1, . . . 364-2-C (collectively, connection information display logic 364-2) that display connection information that is generated or otherwise provisioned by one or both of the connection information provisioning logic 328 of the network device 302 and the connection information provisioning logic 348 of the computing devices 304.

The connection information that is displayed via cable displays 162 and 362 (as well as cable displays not shown in FIG. 2 on cable 206) may include various identifying information associated with the devices 102, 104, 202, 204, 302, 304 that are coupled via cables 106, 206, 306. Such identifying information may include, but is not limited to, the building and/or rack or other position therein in which the devices 102, 104, 202, 204, 302, 304 are located, identifications of the devices 102, 104, 202, 204, 302, 304 themselves, the ports 126, 146, 226, 246, 326, 346 to which the cables 106, 206, 306 are connected, etc. The identifying information may also or alternatively include various other information that is programmed by an authorized user (e.g., building, rack, rack location, device identifier, port identifier, notifications, etc.). The cable displays 162, 362 in some embodiments may display identifying information both for "local" and "remote" connections of the cables 106, 206, 306. For example, in the context of the information processing system 100 of FIGS. 1A and 1B, the cable display 162-1 may include "local" identifying information associated with the device 102 that the cable connector 160-1 is connected to, as well as "remote" identifying information associated with the device 104 that the cable connector 160-2 is connected to. Similarly, the cable display 162-2 may include "local" identifying information associated with the device 104 that the cable connector 160-2 is connected to, as well as "remote" identifying information associated with the device 102 that the cable connector 160-1 is connected to.

As discussed in further detail elsewhere herein, in some embodiments both the local and remote identifying information is presented on the same portion or side of an associated one of the cable displays 162, 362. In other embodiments, the local identifying information may be presented on one portion or side of the associated one of the cable displays 162, 262, 362 and the remote identifying information may be presented on another portion or side of the associated one of the cable displays 162, 362. The local and remote identifying information, or portions thereof, may also be scrolled or alternatively displayed (e.g., for limited and repeating time periods) on the associated cable displays 162, 362.

The connection information display logic 164, 364 may be configured to display identifying information (e.g., connectivity information) for both the local and remote devices so long as at least one of the local and remote devices to which the associated cables 106, 206, 306 are connected to are configured to provide generated connection information via connection information provisioning logic 128, 148, 228, 248, 328, 348. In the example of the information processing system 100 of FIG. 1, for example, the connection information provisioning logic 148 is optional, in that the connection information provisioning logic 128 may generate connection information for display on both the cable displays 162-1 and 162-2. Alternatively, the connection information provisioning logic 128 provides connection information for display on cable display 162-1, while the connection information provisioning logic 148 provides connection information for display on cable display 162-2.

In some embodiments, devices (e.g., 102, 104, 202, 204, 302, 304) are enabled via the connection information provisioning logic 128, 148, 228, 248, 328, 348 to provide the connection information for display on the cable displays 162, 362 utilizing sideband interfaces of the cables 106, 206, 306. Such sideband interfaces, which may comprise one or more of an Inter-Integrated Circuit (I2C) sideband interface, an Improved I2C (I3C) sideband interface, an SPI sideband interface, and a Universal Asynchronous Receiver-Transmitter (UART) sideband interface, is advantageously coupled between cable connectors 160, 360 of the cables 106, 206, 306 and the integrated cable displays 162, 362 (e.g., using communication wires that are part of the cable wiring of the cables 106, 206, 306). The cable displays 162, 362 are configured via the connection information display logic 164, 364 to show or represent various types of connection information. The connection information, in some embodiments, includes various identifying information of "local" and "remotely" connected devices, including but not limited to programmable labels for the local and remotely connected devices, port connectivity information, link status information, performance data information, etc. As will be described in further detail elsewhere herein, the local connected device refers to the device that is connected to the cable connector proximate a given cable display (e.g., at the same end of the cable), while the remote connected device refers to the device that is connected to a cable connector proximate an opposite end of the cable.

Switches and other network devices with pluggable optics may have in common various data signals (e.g., transmit (TX) and receive (RX) data signals) as well as control signals (e.g., I2C signals, discrete signals such as reset, present, etc.). Various module formats, including but not limited to Small Form-Factor Pluggable (SFP), enhanced Small Form-Factor Pluggable (SFP+), Quad Small Form-Factor Pluggable (QSFP), enhanced Quad Small Form-Factor Pluggable (QSFP+), Quad Small Form-Factor Pluggable 28 (QSFP28), Quad Small Form-Factor Pluggable Double Density (QSFP-DD), etc., have standardized around the I2C interface, and newer standards are likely to use I3C which can also support I2C devices.

In some embodiments, otherwise conventional switch implementations may be modified to read interface and/or dynamic configuration neighbor information for connectivity display purposes. Such interface and dynamic configuration neighbor information may be read using various protocols, including but not limited to Link Layer Discovery Protocol (LLDP), Industry Standard Discovery Protocol (ISDP), Cisco® Discovery Protocol (CDP), etc. Upon reading the data from software, an operating system (OS) or other software (e.g., implementing connection information provisioning logic 128, 148, 228, 248, 328, 348) renders the identifying information to be displayed on glass-free cable displays integrated on cables utilizing sideband interfaces (e.g., I2C, UART, etc.) of the cables. As described above and elsewhere herein, cables may also be designed for breakout or fan-out scenarios, where the displays may update every few seconds (or other configurable interval) to provide information on the different breakout ports. While various embodiments are described above and elsewhere herein with respect to display of identifying information (e.g., device identifying information, port information, etc.), various other types of connectivity information such as performance data, alarms or notifications, inventory data (e.g., collected via LLDP), etc. may also or alternatively be generated or otherwise provisioned for display on the cables.

For long cables, I2C signal integrity may become a limiting factor, and the I2C communication from the switch or other network device host may be translated to a more robust signaling scheme. Such long cables may be configured with a micro-controller (e.g., instead of or in addition to an electronically erasable programmable read-only memory (EEPROM)). Such micro-controllers may be enhanced with UART sideband interfaces for handling communication with integrated cable displays to provide a robust solution for long cables. The micro-controller can help abstract the display implementation from the host device having a standard host API for multiple types of displays.

Figure 4:
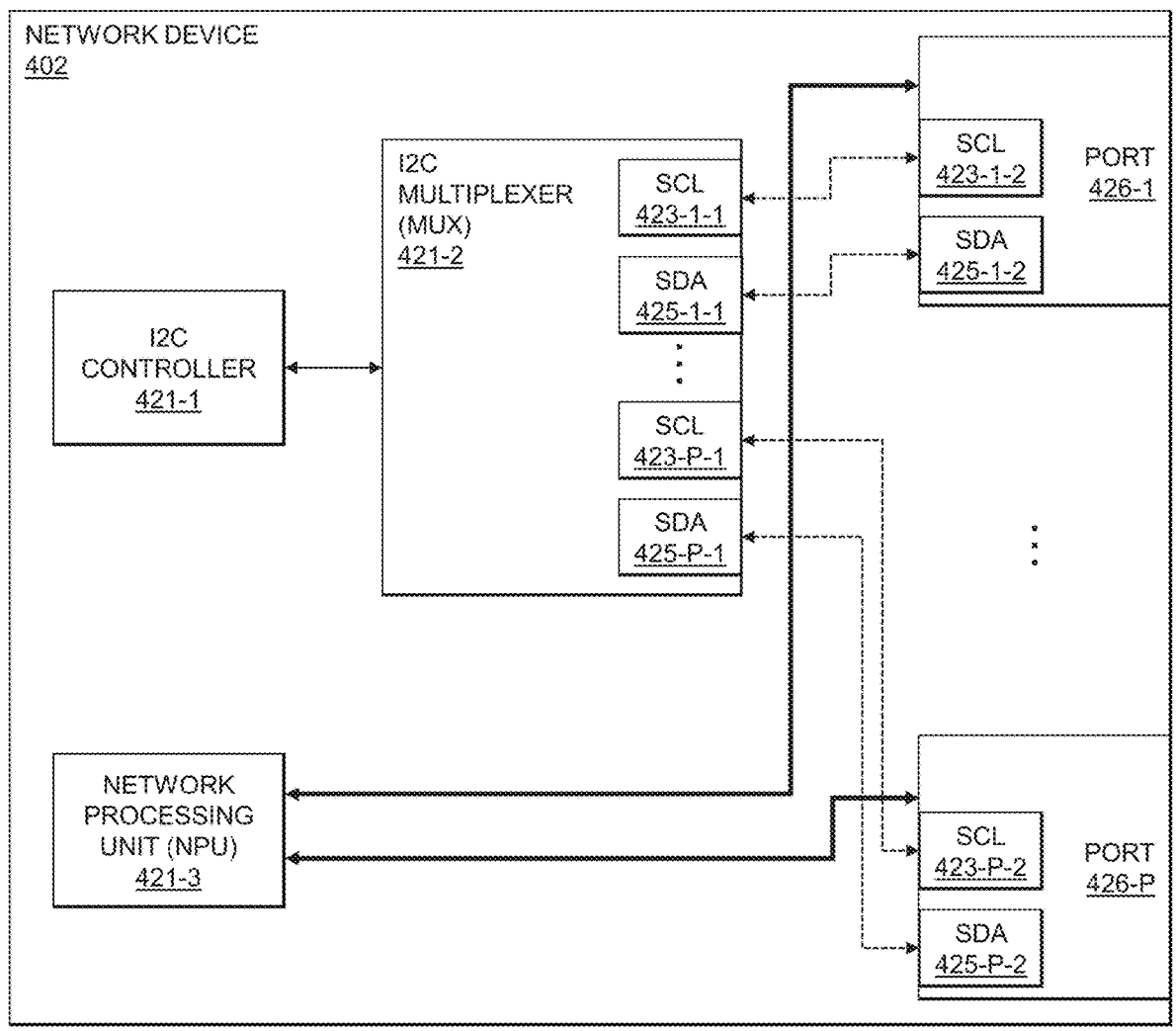
FIG. 4 shows a network device configured for provisioning connection information for display on a cable used to couple the network device with one or more additional devices utilizing an inter-integrated circuit bus interface protocol in an illustrative embodiment.

FIG. 4 shows a network device 402 that is configured with an I2C controller 421-1, an I2C multiplexer (MUX) 421-2, and an NPU 421-3. The I2C Mux 421-2 includes sets of Serial Data (SDA) and Serial Clock (SCL) lines, including SCLs 423-1-1, . . . 423-P-1 and SDAs 425-1-1, . . . 425-P-1 coupled with respective SCLs 423-1-2, . . . 423-P-2 and SDAs 425-1-2, . . . 425-P-2 on ports 426-1, . . . 426-P of the network device 402.

Figure 5:
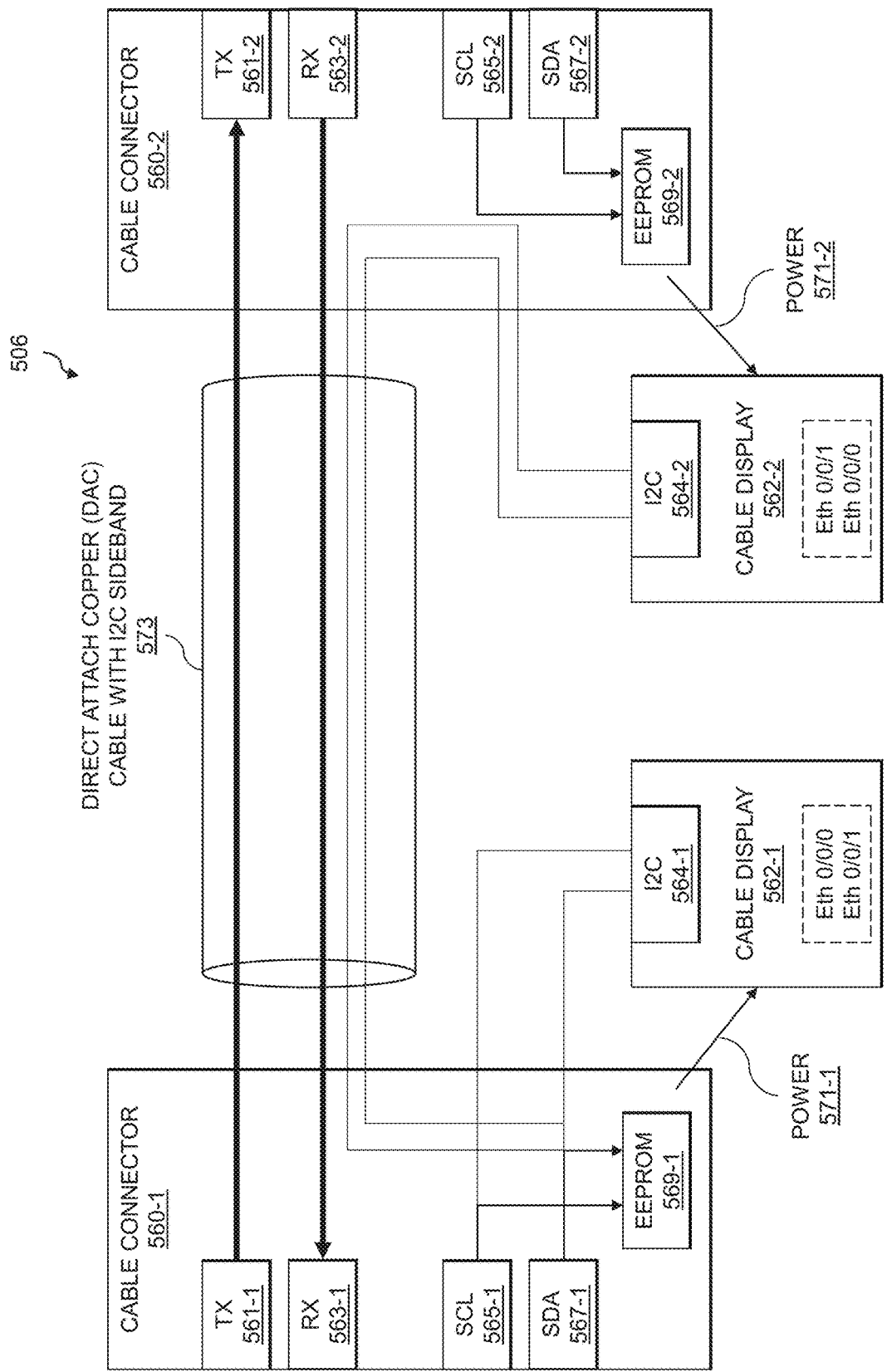
FIG. 5 shows a cable configured for display of connection information utilizing an inter-integrated circuit bus interface protocol in an illustrative embodiment.

FIG. 5 shows a cable 506, which includes cable connectors 560-1 and 560-2 (collectively, cable connectors 560) coupled via a DAC cable with I2C sideband 573. The cable 506 also includes cable displays 562-1 and 562-2 (collectively, cable displays 562) located adjacent or proximate to the cable connectors 560-1 and 560-2. The cable connectors 560-1 and 560-2 include respective transmission (TX) lines 561-1 and 561-2 (collectively, TX lines 561), receive (RX) lines 563-1 and 563-2 (collectively, RX lines 563), SCL lines 565-1 and 565-2 (collectively, SCL lines 565), SDA lines 567-1 and 567-2 (collectively, SDA lines 567), and EEPROMs 569-1 and 569-2 (collectively, EEPROMs 569). The cable connectors 560-1 and 560-2 each provide power 571-1 and 571-2 to the cable displays 562-1 and 562-2 proximate thereto.

The cable displays 562-1 and 562-2 include respective I2C interfaces 564-1 and 564-2 (collectively, I2C interfaces 564). Here, it is assumed that both cable displays 562-1 and 562-2 are controlled via connection information provided from cable connector 560-1, as the SCL line 565-1 and SDA line 567-1 are coupled to both the I2C interface 564-1 of cable display 562-1 and the I2C interface 564-2 of cable display 562-2. In this example, the cable display 562-1 displays "local" information associated with the port that the cable connector 560-1 is connected to on its first line ("Eth 0/0/0") and "remote" information associated with the port that the cable connector 560-2 is connected to on its second line ("Eth 0/0/1"). Similarly, the cable display 562-2 displays "local" information associated with the port that the cable connector 560-2 is connected to on its first line ("Eth 0/0/1") and "remote" information associated with the port that the cable connector 560-1 is connected to on its second line ("Eth 0/0/0").

Figure 6:
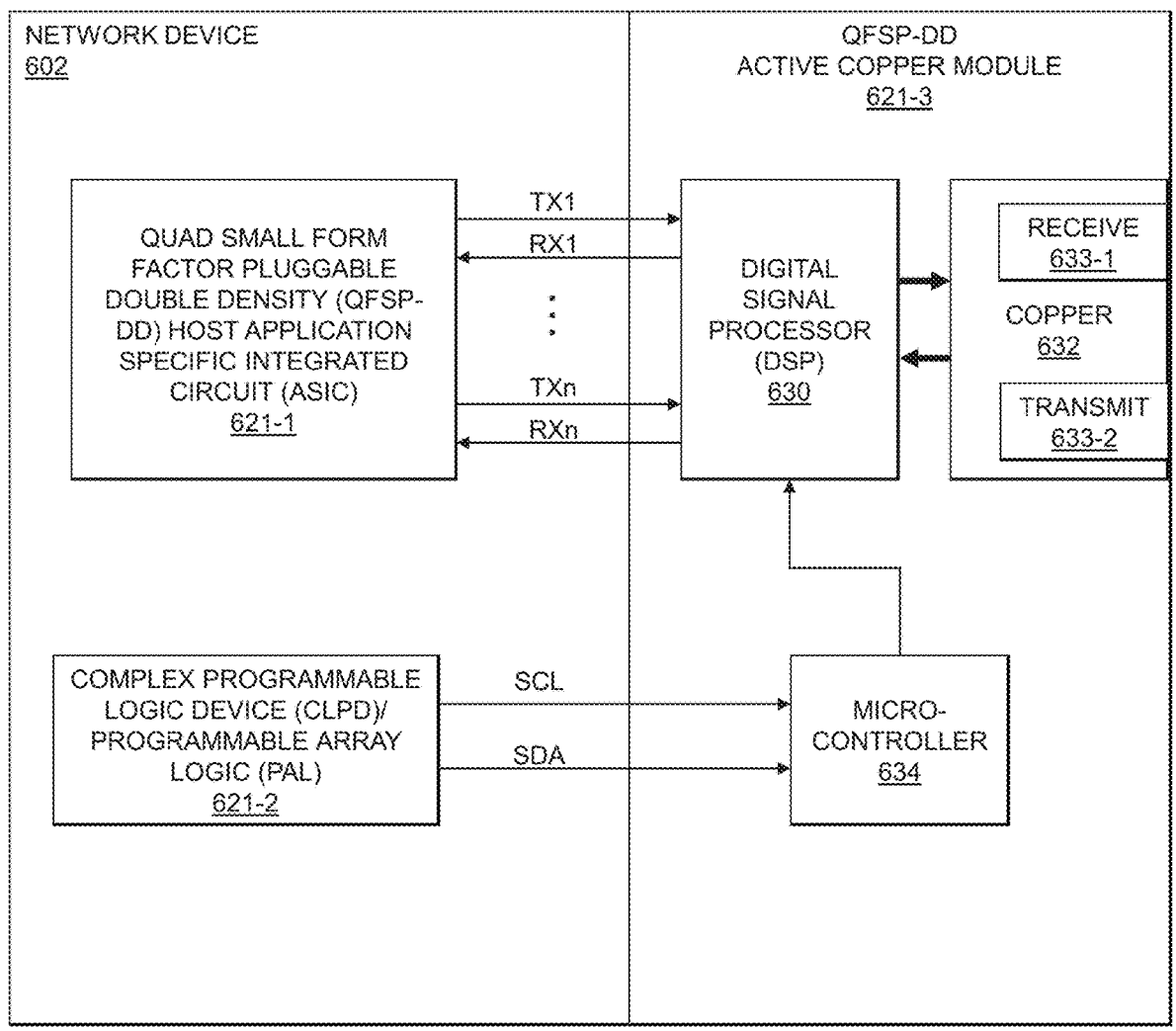
FIG. 6 shows a network device configured for provisioning connection information for display on a cable used to couple the network device with one or more additional devices utilizing a universal asynchronous receiver-transmitter device-to-device communication protocol in an illustrative embodiment.

FIG. 6 shows a network device 602 that is configured with a QFSP-DD host ASIC 621-1, a Complex Programmable Logic Device (CPLD)/Programmable Array Logic (PAL) 621-2 and QFSP-DD active copper module 621-3. The QFSP-DD host ASIC 621-1 includes sets of TX and RX lines (TX1, . . . TXn and RX1, . . . RXn) coupled with a digital signal processor (DSP) 630 of the active copper module 621-3. The DSP 630 communicates the data with copper 632 (e.g., via an active copper cable) of the QFSP active copper module 621-3, with the copper 632 including receive 633-1 and transmit 633-2 elements. The CLPD/PAL 621-2 implements I2C type communication along SCL and SDA lines with a micro controller 634 of the QFSP-DD active copper module 621-3. The micro controller 634 provides such data for communication via the copper 632 of the QFSP-DD active copper module 621-3.

Figure 7:
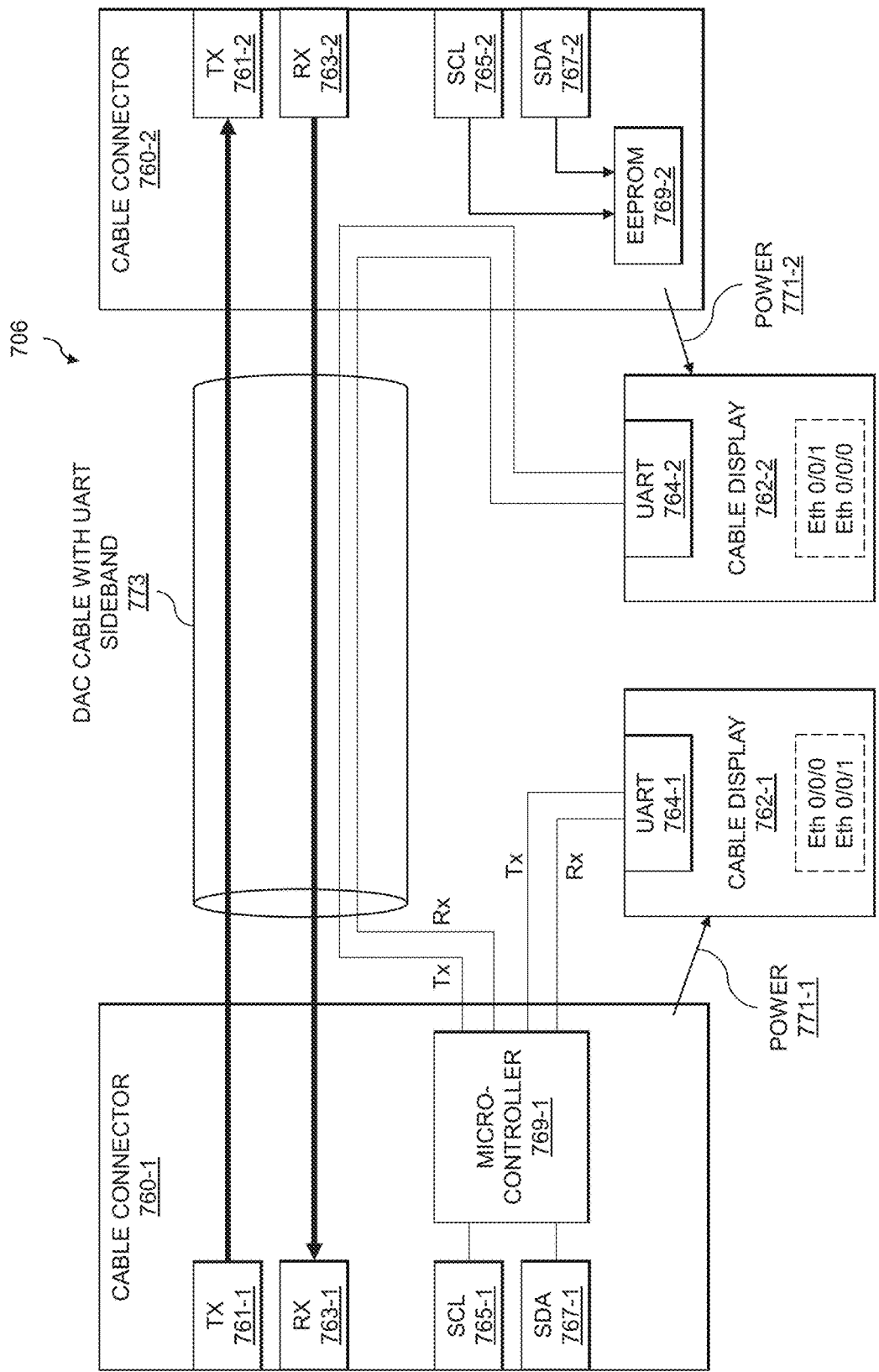
FIG. 7 shows a cable configured for display of connection information utilizing a universal asynchronous receiver-transmitter device-to-device communication protocol in an illustrative embodiment.

FIG. 7 shows a cable 706, which includes cable connectors 760-1 and 760-2 (collectively, cable connectors 760) coupled via a DAC cable with UART sideband 773. The cable 706 also includes cable displays 762-1 and 762-2 (collectively, cable displays 762) located adjacent or proximate to the cable connectors 760-1 and 760-2. The cable connectors 760-1 and 760-2 include respective transmission (TX) lines 761-1 and 761-2 (collectively, TX lines 761), receive (RX) lines 763-1 and 763-2 (collectively, RX lines 763), SCL lines 765-1 and 765-2 (collectively, SCL lines 765), and SDA lines 767-1 and 767-2 (collectively, SDA lines 767). The cable connector 760-1 includes a micro-controller 769-1 coupled to the SCL line 765-1 and SDA line 767-1, while the cable connector 760-2 includes an EEPROM 769-2 coupled to the SCL line 765-2 and SDA line 767-2. It should be appreciated, however, that in other embodiments the cable connector 760-2 may include a micro-controller instead of (or in addition to) the EEPROM 769-2 which is coupled to the SCL line 765-2 and SDA line 767-2, and/or the cable connector 760-1 may include an EEPROM in addition to the micro-controller 769-1. The cable connectors 760-1 and 760-2 each provide power 771-1 and 771-2 to the cable displays 762-1 and 762-2 proximate thereto.

The cable displays 762-1 and 762-2 include respective UART interfaces 764-1 and 764-2 (collectively, UART interfaces 764). Here, it is assumed that both cable displays 762-1 and 762-2 are controlled via connection information provided from cable connector 760-1, as the micro-controller 769-1 is coupled to both the UART interface 764-1 of the cable display 762-1 and the UART interface 764-2 of the cable display 762-2. In this example, the cable display 762-1 displays "local" information associated with the port that the cable connector 760-1 is connected to on its first line ("Eth 0/0/0") and "remote" information associated with the port that the cable connector 760-2 is connected to on its second line ("Eth 0/0/1"). Similarly, the cable display 762-2 displays "local" information associated with the port that the cable connector 760-2 is connected to on its first line ("Eth 0/0/1") and "remote" information associated with the port that the cable connector 760-1 is connected to on its second line ("Eth 0/0/0").

Figure 8B:
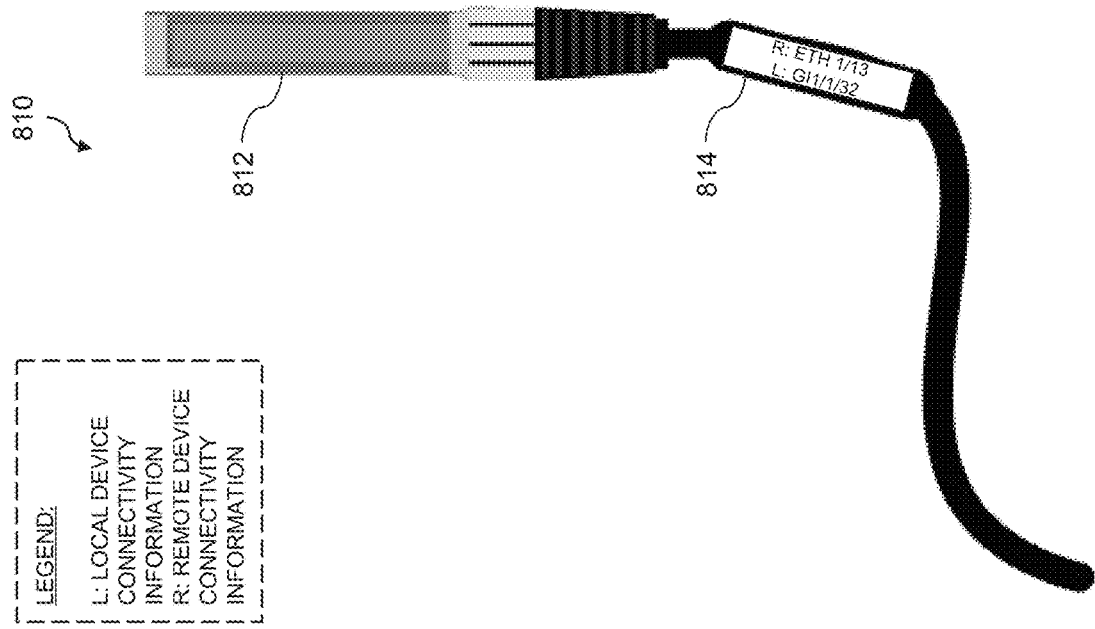
FIGS. 8A-8D show top and side views of cable configured for display of connection information in an illustrative embodiment.
Figure 8A:
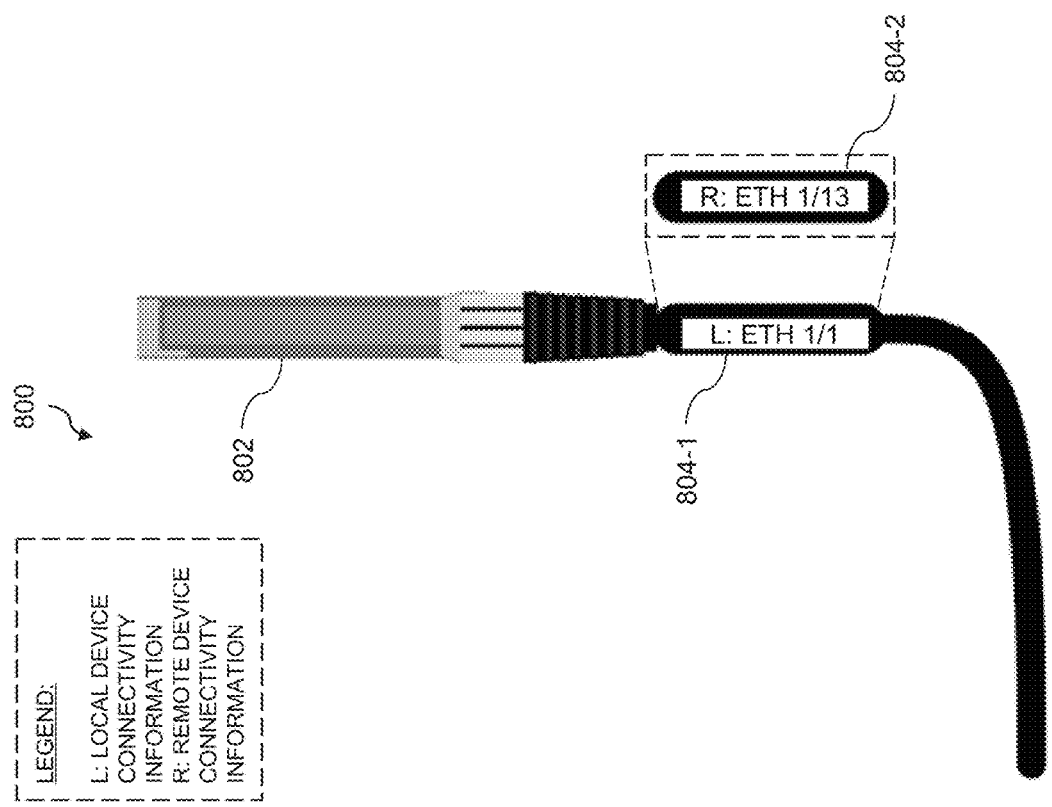
Figure 8C:
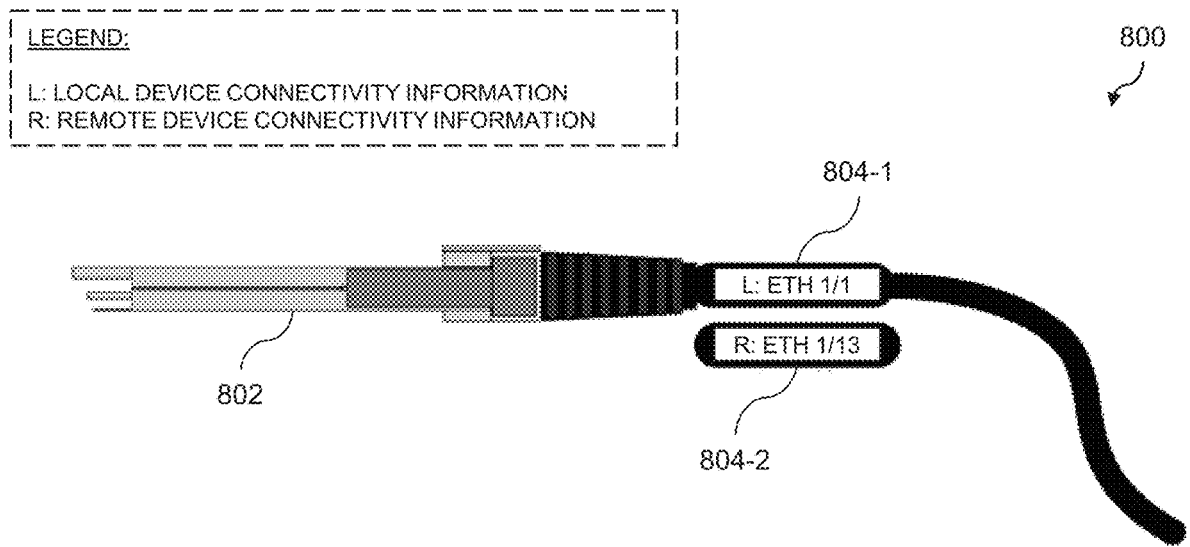
Figure 8D:
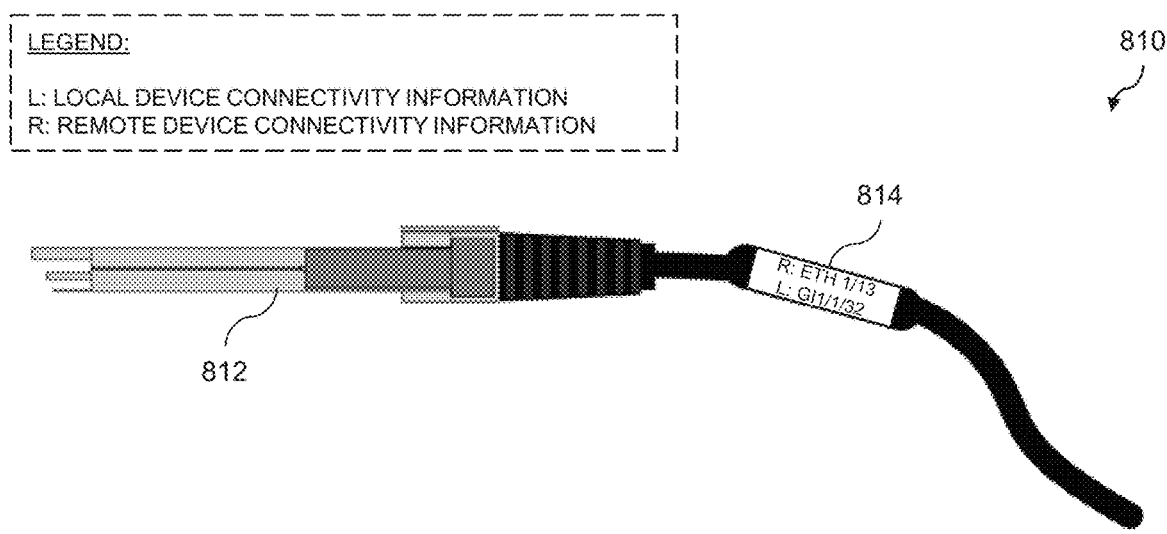

FIGS. 8A-8D show different views of cables 800 and 810 configured for providing connectivity information on integrated cable displays thereof. FIGS. 8A and 8C show top and side views of cable 800, which includes a connector 802 and an integrated cable display with a first (front) side 804-1 that displays local identifying information ("L: ETH 1/1") for the device that the connector 802 is connected to, and a second (back) side 804-2 that displays remote identifying information ("R: ETH 1/13") for a device connected to another connector (not shown) at the other end (not shown) of the cable 800. FIGS. 8B and 8D show top and side views of cable 810, which includes a connector 812 and an integrated cable display 814 that displays on one side or portion thereof both local ("L: GI1/1/32") identifying information for a device that the connector 812 is connected to and remote ("R: ETH 1/13") identifying information for a device connected to another connector (not shown) at the other end (not shown) of the cable 810.

Figure 9:
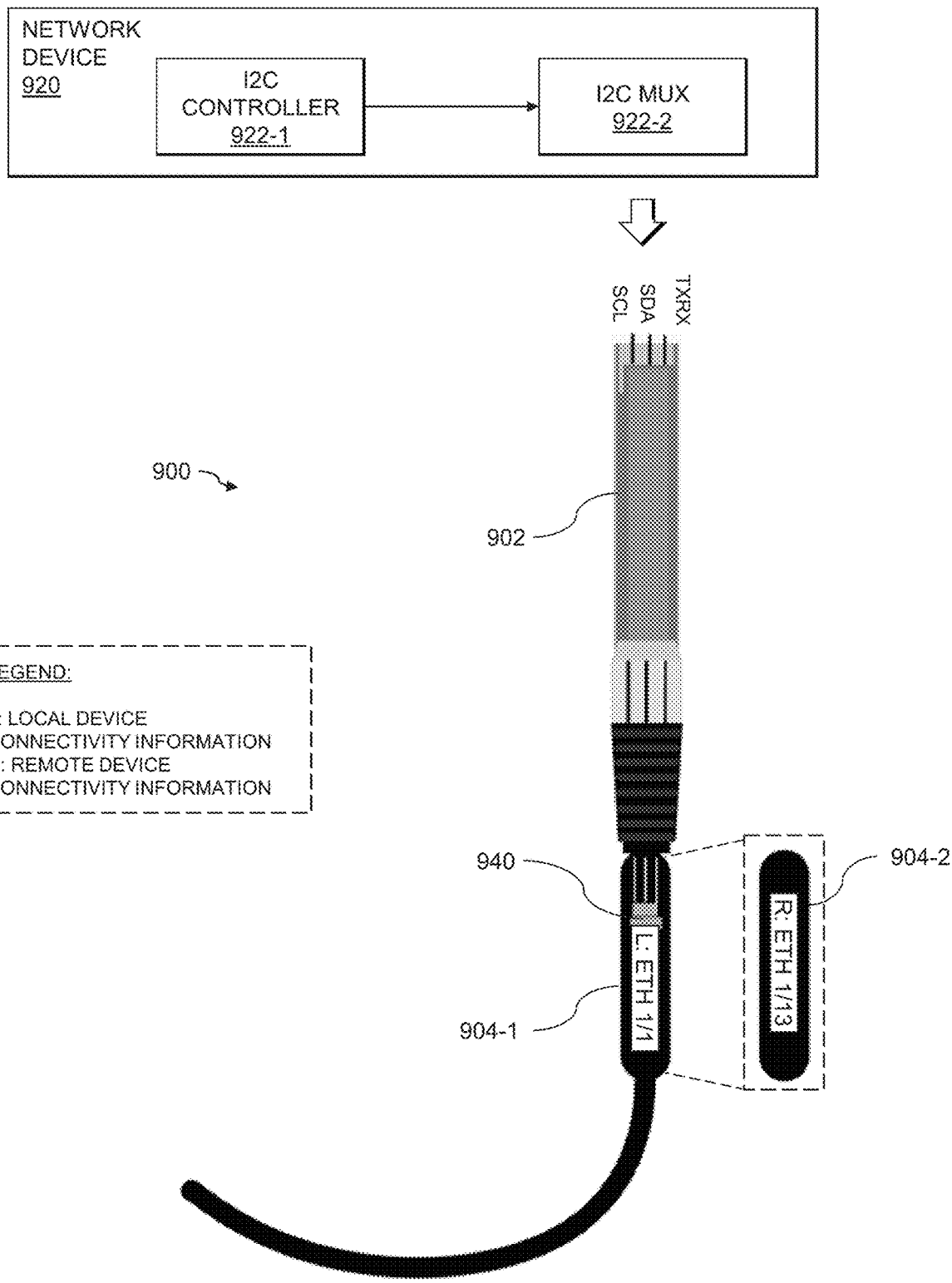
FIG. 9 shows a top view of a cable configured for display of connection information utilizing an inter-integrated circuit bus interface protocol in an illustrative embodiment.

FIG. 9 shows a top view of a cable 900 that includes a connector 902 and integrated cable display with a first (front) side 904-1 that displays local identifying information ("L: ETH 1/1") for the device that the connector 902 is connected to, and a second (back) side 904-2 that displays remote identifying information ("R: ETH 1/13") for a device connected to another connector (not shown) at the other end (not shown) of the cable 900. FIG. 9 further shows the I2C controller 922-1 and I2C MUX 922-2 of a network device 920 that the connector 902 is coupled to. As illustrated, the I2C MUX 922-2 provides data to transmit/receive lines (TXRX), an SDA line and SCL line. The TXRX, SDA and SCL lines are illustratively coupled with I2C interface 940 of the integrated cable display of the cable 900 for communicating generated connectivity or identifying information for output on the first and second sides 904-1 and 904-2 of the integrated cable display.

Figure 10A:
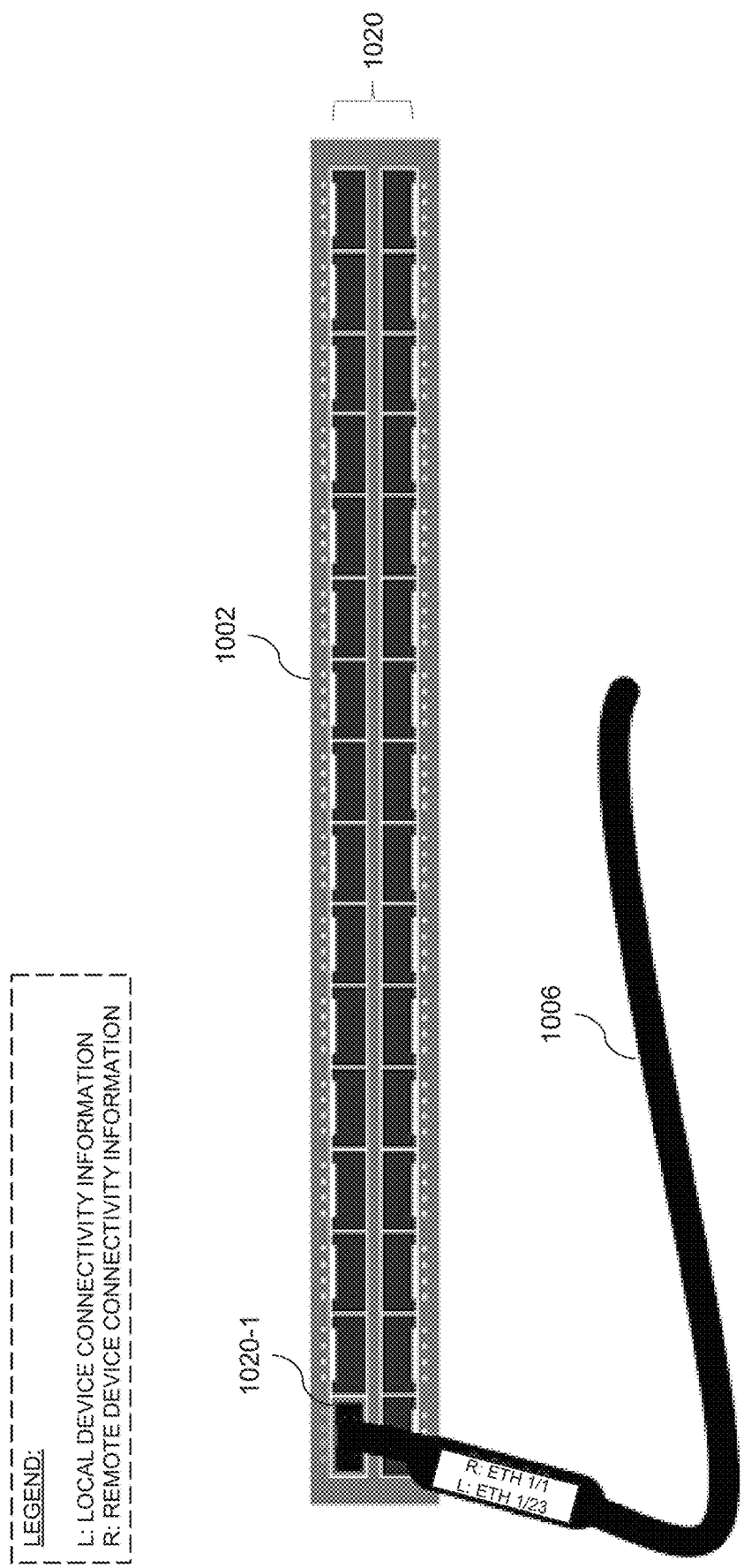
FIGS. 10A-10D show side and top views of a cable configured for display of connection information coupled to a switch device in an illustrative embodiment.
Figure 10B:
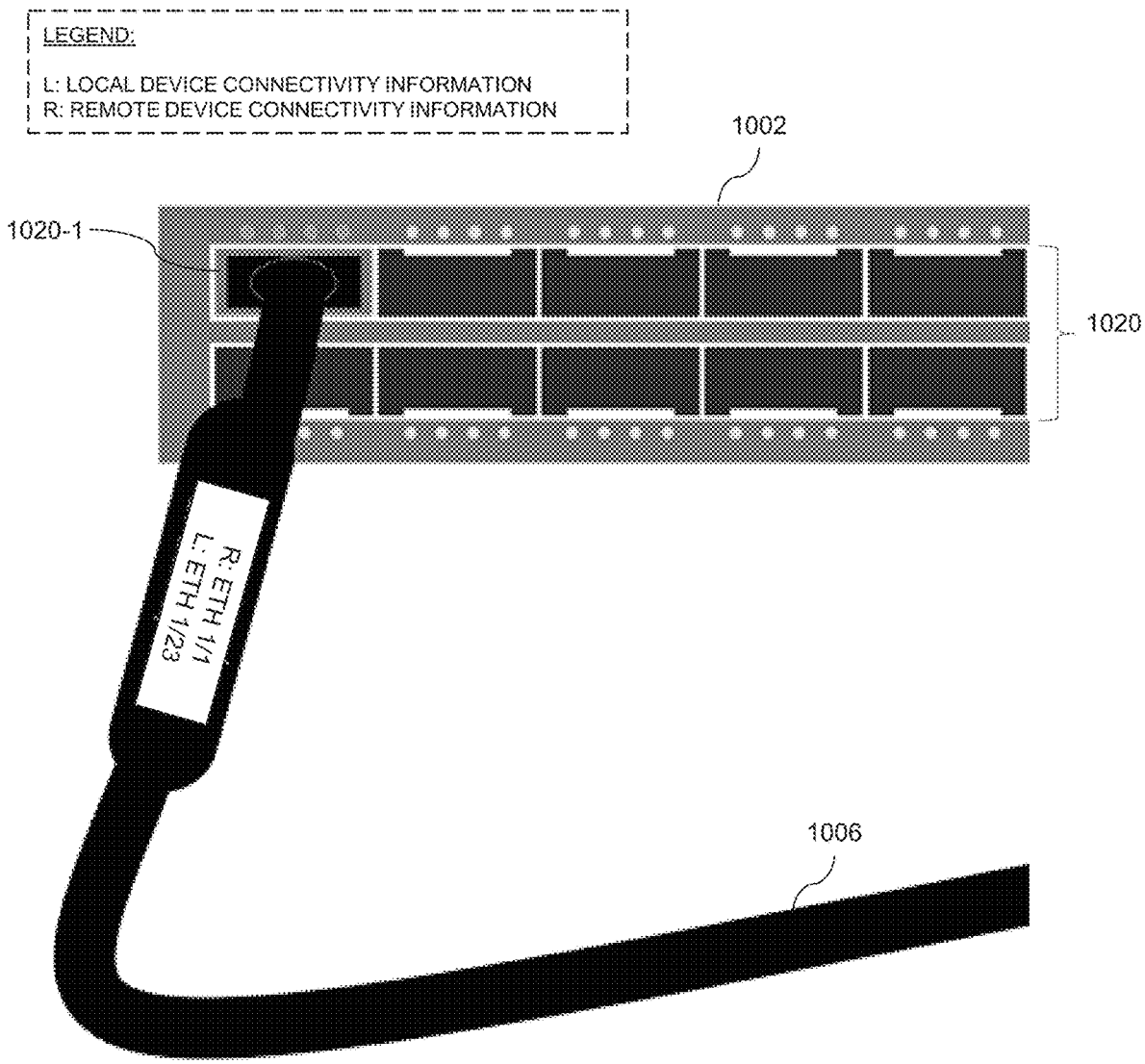
Figure 10C:
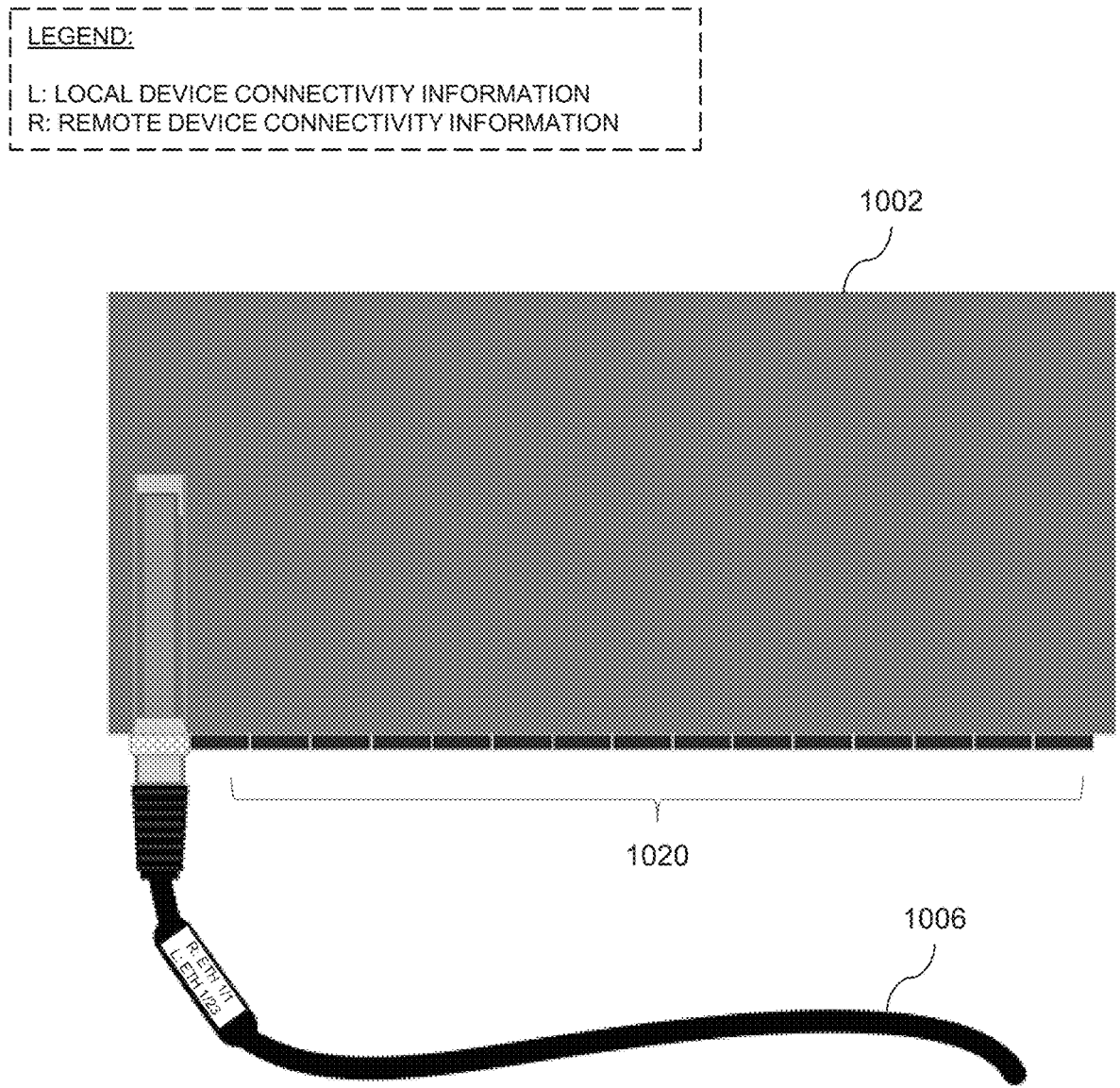
Figure 10D:
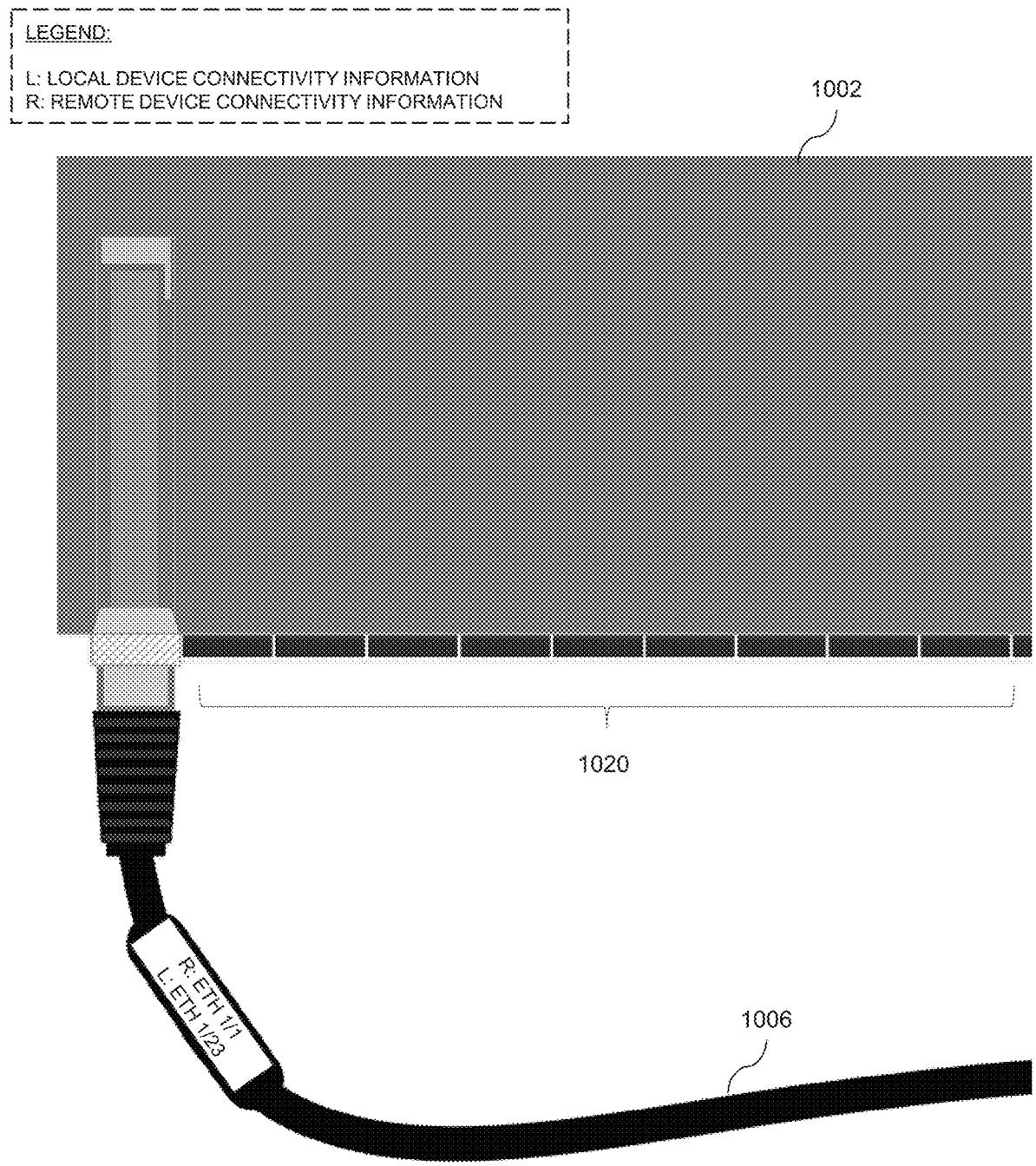

FIGS. 10A-10D illustrate a cable 1006 coupled to one of a set of ports 1020 of a switch or other network device 1002. More particularly, FIG. 10A shows a side view of the cable 1006 with a first connector plugged into a port 1020-1 of the network device 1002. FIG. 10B shows a close-up view of the cable 1006 with its first connector plugged into the port 1020-1 of the network device 1002. FIG. 10C shows a top view of the cable 1006 with its first connector plugged into the port 1020-1 of the network device 1002, and FIG. 10D shows a close-up top view.

Figure 11:
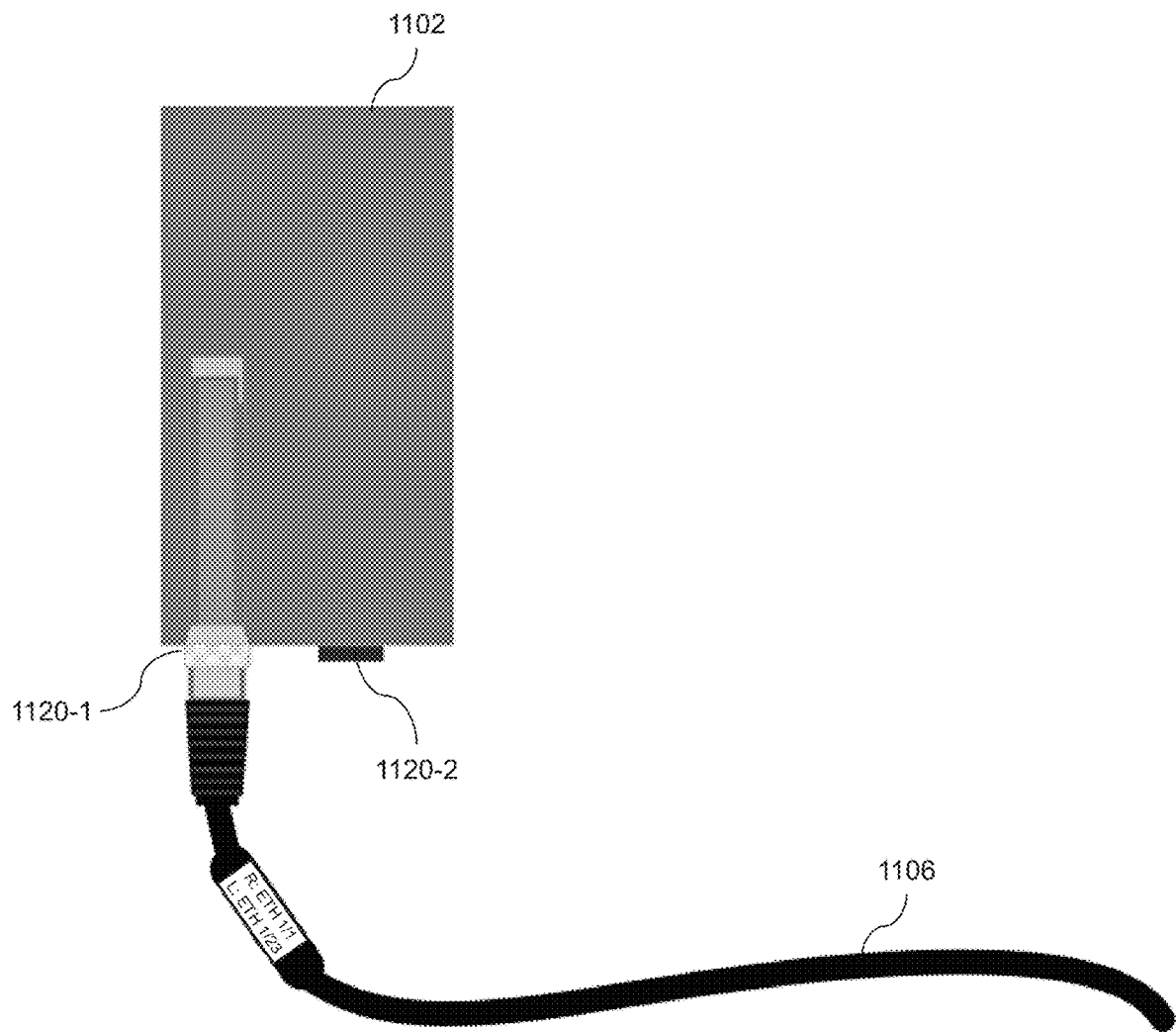
FIG. 11 shows a top view of a cable configured for display of connection information coupled to a network interface card in an illustrative embodiment.

FIG. 11 shows a top view of a cable 1106 with a first connector coupled to a port 1120-1 of a network interface card (NIC) 1102, the NIC 1102 having ports 1120-1 and 1120-2. The NIC 1102 may be installed into another device (e.g., a computing device, such as a server device, storage system, etc.).

Figure 12:
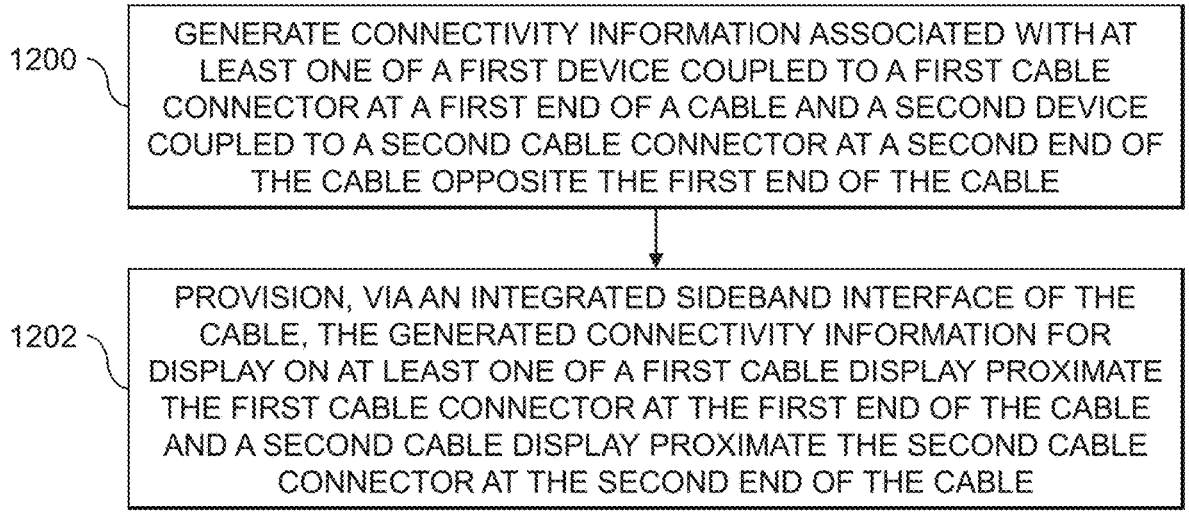
FIG. 12 is a flow diagram of an exemplary process for provisioning and displaying connection information utilizing one or more cables used to couple devices in an illustrative embodiment.

An exemplary process for provisioning and displaying connection information on one or more cables used to couple devices will now be described in more detail with reference to the flow diagram of FIG. 12. It is to be understood that this particular process is only an example, and that additional or alternative processes for provisioning and displaying connection information on one or more cables used to couple devices may be used in other embodiments.

In this embodiment, the process includes steps 1200 and 1202. These steps are assumed to be performed utilizing the connection information provisioning logic 128, 228, 328 and connection information display logic 164, 364. The process begins with step 1200, generating connectivity information associated with at least one of a first device (e.g., 102, 202, 302) coupled to a first cable connector (e.g., 160-1, 360-1, 560-1, 760-1) at a first end of a cable (e.g., 106, 206, 306, 506, 706) and a second device (e.g., 104, 204, 304) coupled to a second cable connector (e.g., 160-2, 360-2, 560-2, 760-2) at a second end of the cable opposite the first end of the cable. In step 1202, the generated connectivity information is provisioned, via an integrated sideband interface of the cable, for display on at least one of a first cable display (e.g., 162-1, 362-1, 562-1, 762-1) proximate the first cable connector at the first end of the cable and a second cable display (e.g., 162-2, 362-2, 562-2, 762-2) proximate the second cable connector at the second end of the cable.

The integrated sideband interface of the cable comprises at least one of an I2C interface and a UART interface. Step 1202 may comprise sending the generated connectivity information over at least one of an SCL line and an SDA line coupling the first device to the first cable connector of the cable. Where the integrated sideband interface of the cable is an I2C interface, a subset of communication wires of the cable may comprise the SCL line and the SDA line coupled to the first cable connector and respective I2C interfaces of the first cable display and the second cable display. Where the integrated sideband interface of the cable is a UART interface, a subset of the communication wires of the cable may comprise one or more transmit (TX) and receive (RX) lines coupled to a micro-controller of the first cable connector and respective UART interfaces of the first cable display and the second cable display, the micro-controller of the first cable connector being coupled to an SCL line and an SDA line of the first cable connector. The cable may comprise DAC cable wiring. In some embodiments, the cable wiring comprises fan-out cable wiring with multiple second ends having associated instances of the second cable connector and second cable display. One or both of the first cable display and the second cable display may comprise a flexible display that is wrapped around a portion of the cable wiring.

The generated connectivity information may comprise at least one of first identifying information for a first location of the first device that the first cable connector is coupled to and second identifying information for a second location of the second device that the second cable connector is coupled to. The first location of the first device may specify at least one of a first port of the first device that the first cable connector is coupled to and the second location of the second device may specify a second port of the second device that the second cable connector is coupled to. The first location of the first device may also or alternatively specify at least one of a building and a rack in which the first device is located and the second location of the second device may also or alternatively specify at least one of a building and a rack in which the second device is located. In some embodiments, step 1202 includes provisioning both the first identifying information and the second identifying information for display on the first cable display proximate the first cable connector at the first end of the cable, and potentially also provisioning both the first identifying information and the second identifying information for display on the second cable display proximate the second cable connector at the second end of the cable. In some embodiments, the generated connectivity information also or alternatively comprises at least one of: performance data associated with at least one of the first device, the second device and a link between the first device and the second device provided via the cable; inventory data associated with at least one of the first device, the second device and the cable; and one or more notifications associated with at least one of the first device, the second device, and the link between the first device and the second device provided via the cable.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It should again be emphasized that the above-described embodiments are presented for purposes of illustration only. Many variations and other alternative embodiments may be used. For example, the disclosed techniques are applicable to a wide variety of other types of information processing systems, cables, flexible displays, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
generating connectivity information associated with a first device coupled to a first cable connector at a first end of a cable and a second device coupled to a second cable connector at a second end of the cable opposite the first end of the cable;
provisioning, via an integrated sideband interface of the cable, at least a first portion of the generated connectivity information for display on a first cable display proximate the first cable connector at the first end of the cable; and provisioning, via the integrated sideband interface of the cable, at least a second portion of the generated connectivity information for display on a second cable display proximate the second cable connector at the second end of the cable;

wherein the integrated sideband interface of the cable comprises one or more control lines of the first cable connector connecting the first device to both the first cable display and the second cable display; and wherein at least a subset of the one or more control lines of the first cable connector control at least portions of both the first cable display and the second cable display.

2. The apparatus of claim 1 wherein the generated connectivity information comprises at least one of first identifying information for a first location of the first device that the first cable connector is coupled to and second identifying information for a second location of the second device that the second cable connector is coupled to.

3. The apparatus of claim 2 wherein the first location of the first device specifies a first port of the first device that the first cable connector is coupled to and the second location of the second device specifies a second port of the second device that the second cable connector is coupled to.

4. The apparatus of claim 2 wherein the first location of the first device specifies at least one of a building and a rack in which the first device is located and the second location of the second device specifies at least one of a building and a rack in which the second device is located.

5. The apparatus of claim 2 wherein the first portion of the generated connectivity information comprises both the first identifying information and the second identifying information for display on the first cable display proximate the first cable connector at the first end of the cable.

6. The apparatus of claim 2 wherein the first and second portions of the generated connectivity information each comprise both the first identifying information and the second identifying information for display on both the first cable display proximate the first cable connector at the first end of the cable and the second cable display proximate the second cable connector at the second end of the cable.

7. The apparatus of claim 1 wherein the generated connectivity information comprises at least one of:
performance data associated with at least one of the first device, the second device and a link between the first device and the second device provided via the cable;
inventory data associated with at least one of the first device, the second device and the cable; and
one or more notifications associated with at least one of the first device, the second device, and the link between the first device and the second device provided via the cable.

8. The apparatus of claim 1 wherein the integrated sideband interface of the cable comprises at least one of an inter-integrated circuit interface and a universal asynchronous receiver-transmitter interface.

9. The apparatus of claim 1 wherein the one or more control lines comprise at least one of a serial clock line and a serial data line coupling the first device to the first cable connector of the cable.

10. A method comprising:
generating connectivity information associated with a first device coupled to a first cable connector at a first end of a cable and a second device coupled to a second cable connector at a second end of the cable opposite the first end of the cable;
provisioning, via an integrated sideband interface of the cable, at least a first portion of the generated connectivity information for display on a first cable display proximate the first cable connector at the first end of the cable; and provisioning, via the integrated sideband interface of the cable, at least a second portion of the generated connectivity information for display on a second cable display proximate the second cable connector at the second end of the cable;

wherein the integrated sideband interface of the cable comprises one or more control lines of the first cable connector connecting the first device to both the first cable display and the second cable display;

wherein at least a subset of the one or more control lines of the first cable connector control at least portions of both the first cable display and the second cable display; and wherein the method is performed by at least one processing device comprising a processor coupled to a memory.

11. The method of claim 10 wherein the integrated sideband interface of the cable comprises at least one of an inter-integrated circuit interface and a universal asynchronous receiver-transmitter interface, and wherein the one or more control lines comprise at least one of a serial clock line and a serial data line coupling the first device to the first cable connector of the cable.

12. A computer program product comprising a non-transitory processor-readable storage medium having stored therein program code of one or more software programs, wherein the program code when executed by at least one processing device causes the at least one processing device to perform the method of claim 10.

13. A cable comprising:
cable wiring comprising two or more communication wires;
a first cable connector at a first end of the cable wiring;
a second cable connector at a second end of the cable wiring; and
a first cable display proximate the first cable connector;
a second cable display proximate the second cable connector; and
an integrated sideband interface coupled to a subset of the two or more communication wires of the cable wiring, the subset of the two or more communication wires comprising one or more control lines of the first cable connector;
wherein the integrated sideband interface is configured to receive, via the one or more control lines of the first cable connector, at least a first portion of connectivity information for display on the first cable display and at least a second portion of connectivity information for display on the second cable display, the connectivity information being associated with a first device coupled to the first cable connector and a second device coupled to the second cable connector.

14. The cable of claim 13 wherein at least one of the first and second cable displays comprises a flexible display that is wrapped around a portion of the cable wiring.

15. The cable of claim 13 wherein the cable wiring comprises a direct attach copper cable wiring.

16. The cable of claim 13 wherein the cable wiring comprises fan-out cable wiring, and wherein the second end of the cable wiring comprises a plurality of second ends each coupled to an instance of the second cable connector.

17. The cable of claim 13 wherein the integrated sideband interface comprises an inter-integrated circuit (I2C) interface.

18. The cable of claim 17 wherein the one or more control lines comprise a serial clock line and a serial data line coupled to the first cable connector, and wherein the I2C interface of the integrated sideband interface is coupled to the serial clock line and the serial data line.

19. The cable of claim 13 wherein the integrated sideband interface comprises a universal asynchronous receiver-transmitter interface.

20. The cable of claim 19 wherein the one or more control lines comprise one or more transmit and receive data lines coupled to a micro-controller of the first cable connector, the micro-controller of the first cable connector being coupled to a serial clock line and a serial data line of the first cable connector, and wherein the universal asynchronous receiver-transmitter interface of the integrated sideband interface is coupled to the micro-controller of the first cable connector via the one or more transmit and receive data lines.

* * * * *